United States Patent
Matsumoto

[19]

[11] Patent Number: 5,953,104
[45] Date of Patent: Sep. 14, 1999

[54] IMAGE RECORDING METHOD

[75] Inventor: Nobuo Matsumoto, Kanagawa, Japan

[73] Assignee: Fuji Photo Film Co., Ltd., Kanagawa, Japan

[21] Appl. No.: 08/970,754

[22] Filed: Nov. 14, 1997

[30] Foreign Application Priority Data

Nov. 14, 1996 [JP] Japan ...................................... 8-303283

[51] Int. Cl.⁶ .......................... G03B 27/52; G03B 27/00; G03B 27/32

[52] U.S. Cl. .................................. 355/40; 355/18; 355/27

[58] Field of Search .................................. 355/18, 27, 40, 355/41, 75; 358/449, 453; 396/330, 564; 347/264, 262

[56] References Cited

U.S. PATENT DOCUMENTS

| | | | |
|---|---|---|---|
| 4,660,077 | 4/1987 | Kawamura et al. | 358/75 |
| 5,047,800 | 9/1991 | Fukumoto et al. | 355/45 |
| 5,488,407 | 1/1996 | Tachibana | 347/264 |
| 5,541,626 | 7/1996 | Hiramatsu et al. | 347/8 |
| 5,572,329 | 11/1996 | Otsubo et al. | 358/296 |
| 5,610,728 | 3/1997 | Sobue | 358/449 |
| 5,678,111 | 10/1997 | Matsumoto | 396/564 |

FOREIGN PATENT DOCUMENTS

| | | |
|---|---|---|
| 6-347905 | 12/1994 | Japan . |
| 6-347907 | 12/1994 | Japan . |
| 6-347914 | 12/1994 | Japan . |
| 8-314022 | 11/1996 | Japan . |

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

An image recording method in which stored image data are read in a fixed reading direction from a storage medium, and an image is recorded in a recording range in a fixed recording direction based on the read image data and is recorded on a recording material conveyed to a recording section in a photographic printer or similar device, according to the method an inclination of the recording material in the recording section's detected. Image data is read by effecting either an operation in which an area from which image data is read from the storage medium is varied to coincide with the detected inclination of the recording material based on the detected inclination of the recording material and the reading and recording directions, or an operation in which the image data stored in the storage medium is processed to correspond to the detected inclination of the recording material. An image is recorded on the recording material based on the read image data.

15 Claims, 18 Drawing Sheets

F I G. 7 A
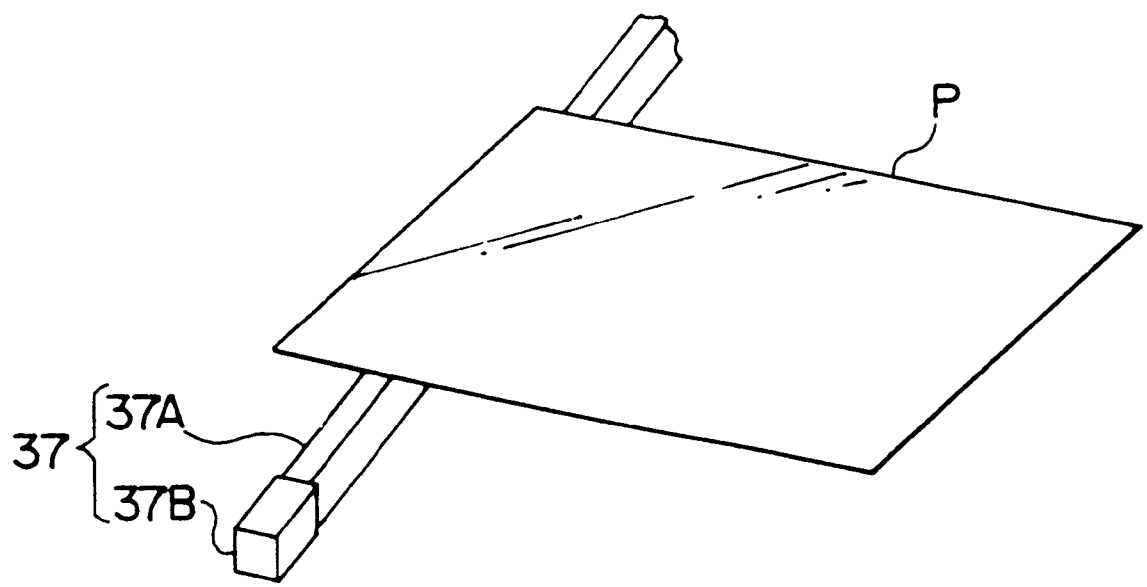
F I G. 7 B
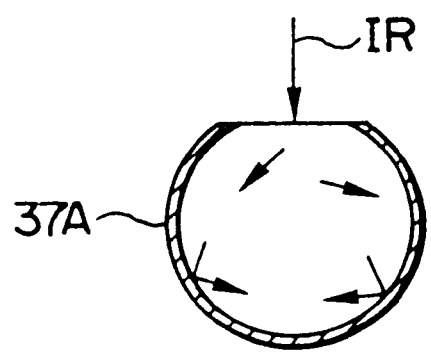

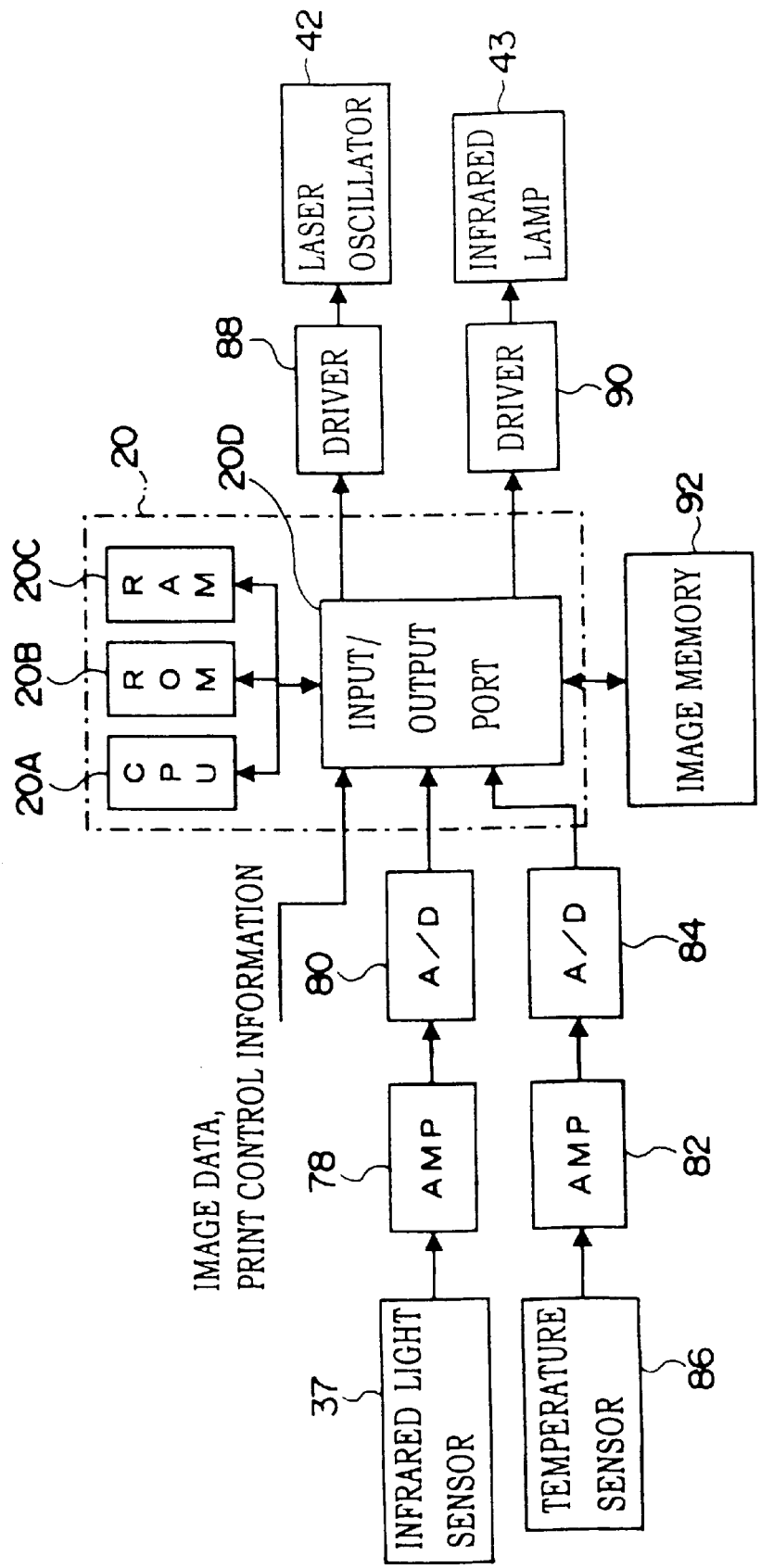

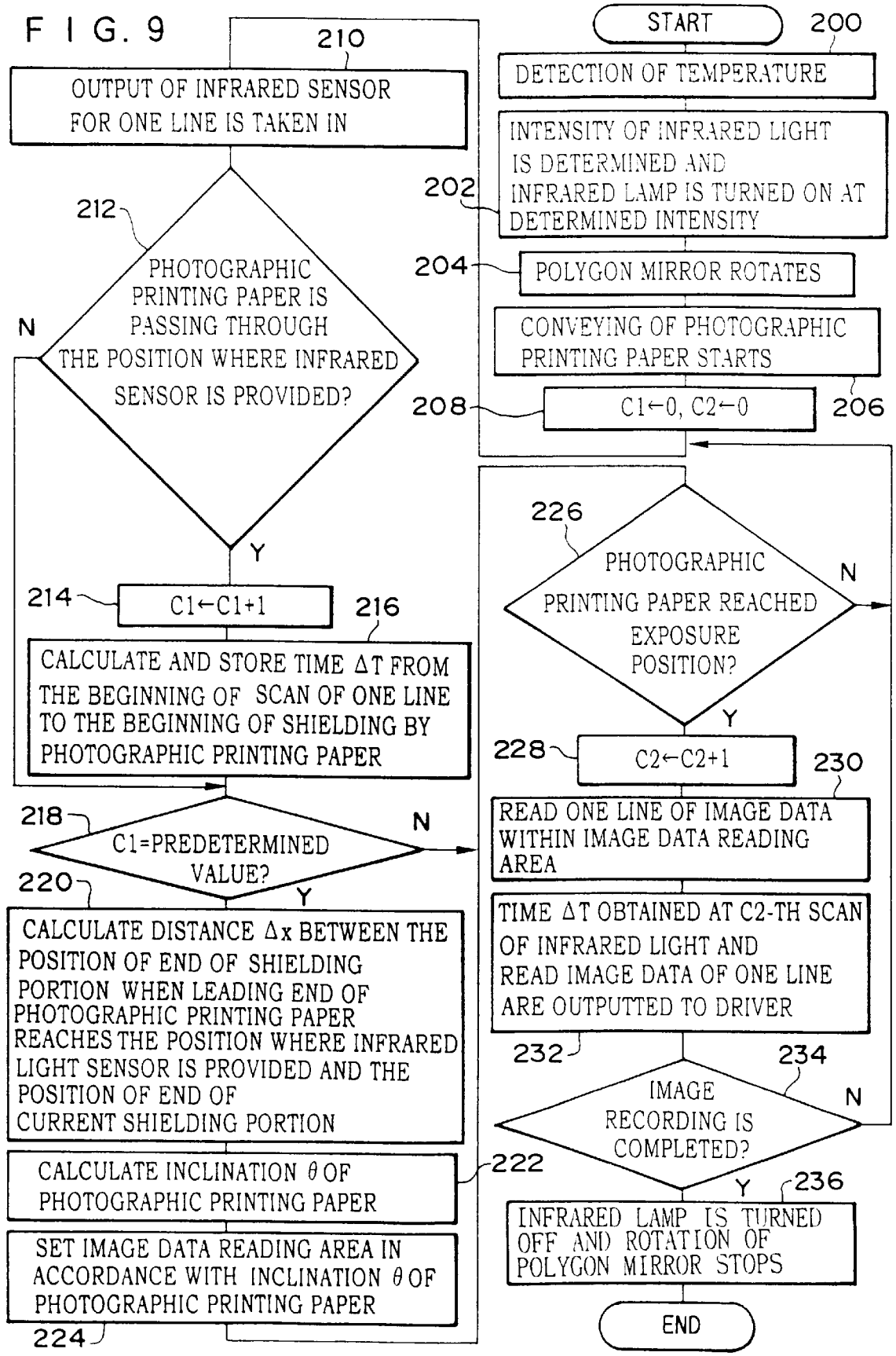

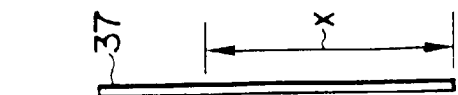
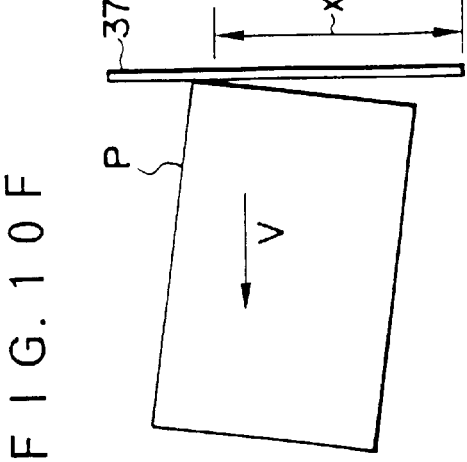
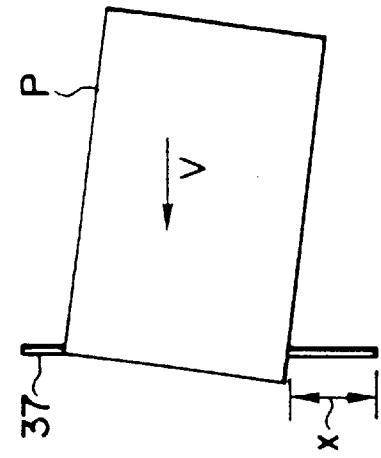
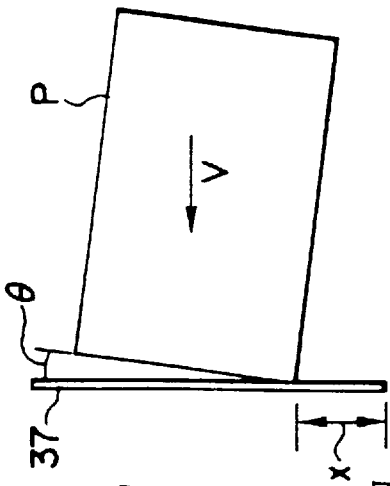
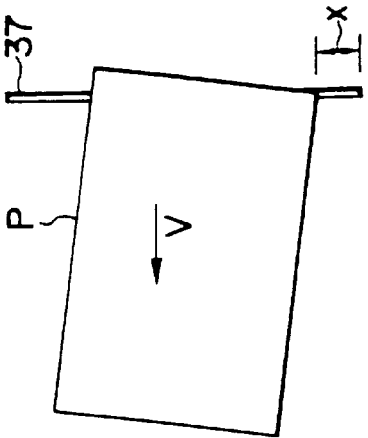
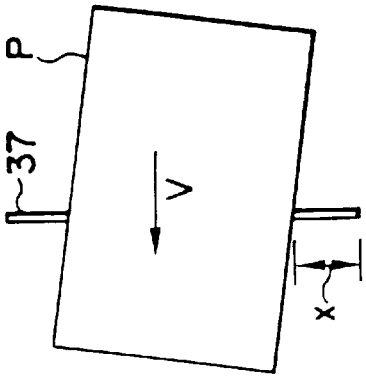
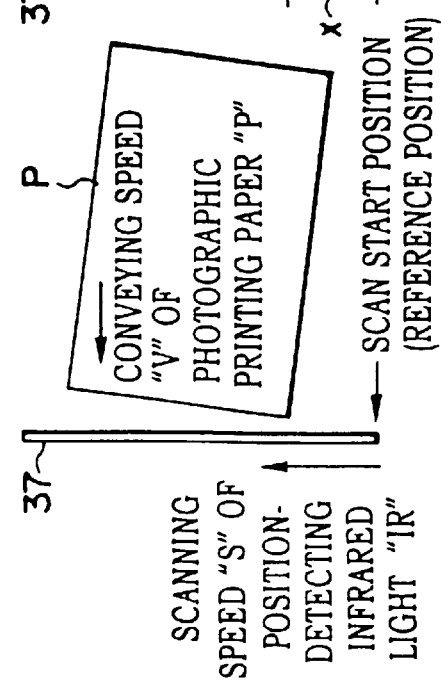

F I G. 1 1 A
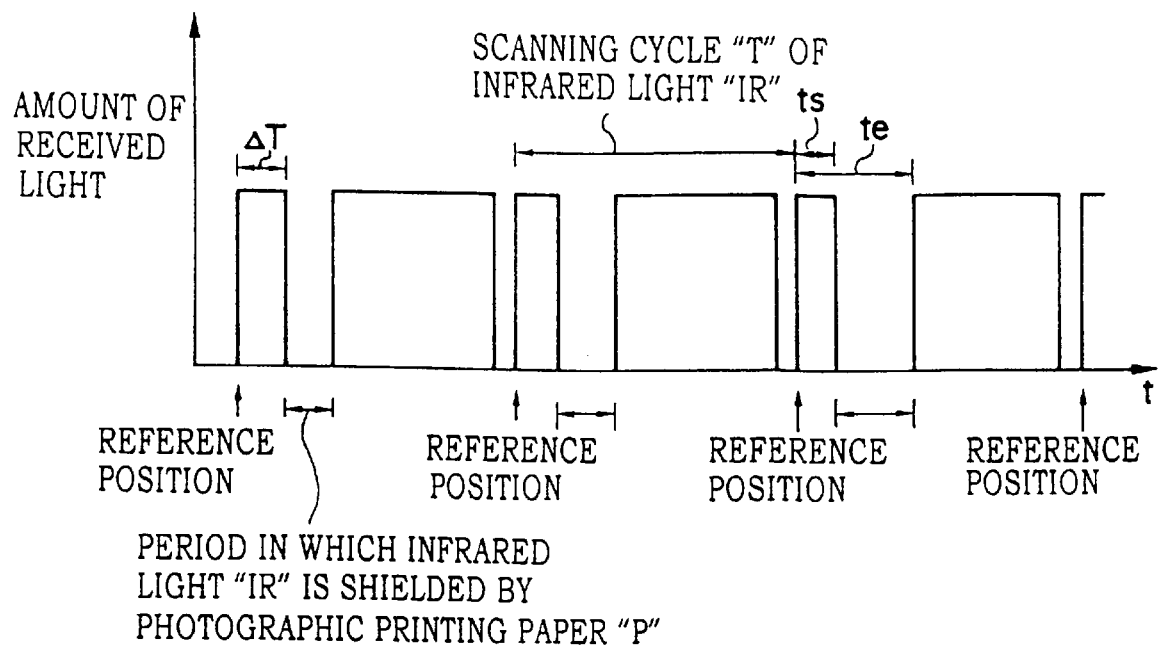
F I G. 1 1 B
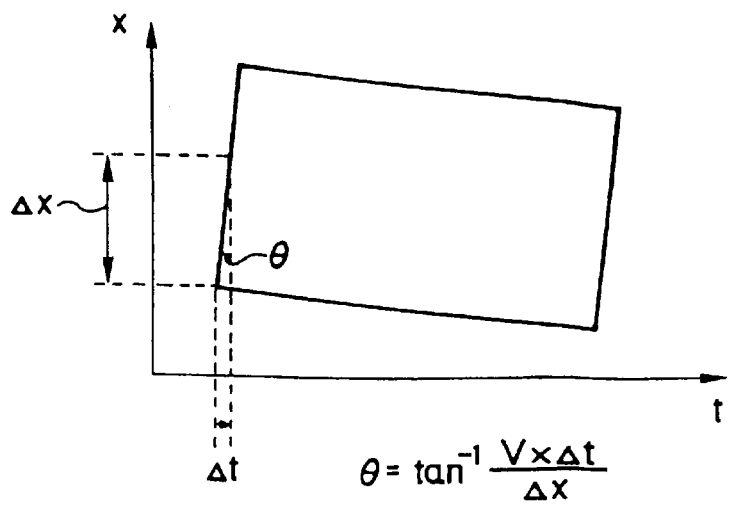

ORIGINAL IMAGE DATA

IMAGE-DATA READING AREA
IMAGE MEMORY
IMAGE-DATA READING DIRECTION

IMAGE-DATA READING AREA
IMAGE-DATA READING DIRECTION

PHOTOGRAPHIC PRINTING PAPER
IMAGE RECORDING DIRECTION (SCANNING DIRECTION OF LASER BEAM "S")

IMAGE RECORDING DIRECTION (SCANNING DIRECTION OF LASER BEAM "S")

F I G. 1 4 A
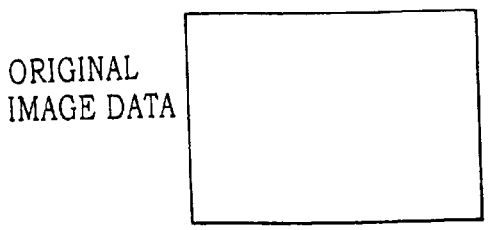
ORIGINAL IMAGE DATA
F I G. 1 4 B
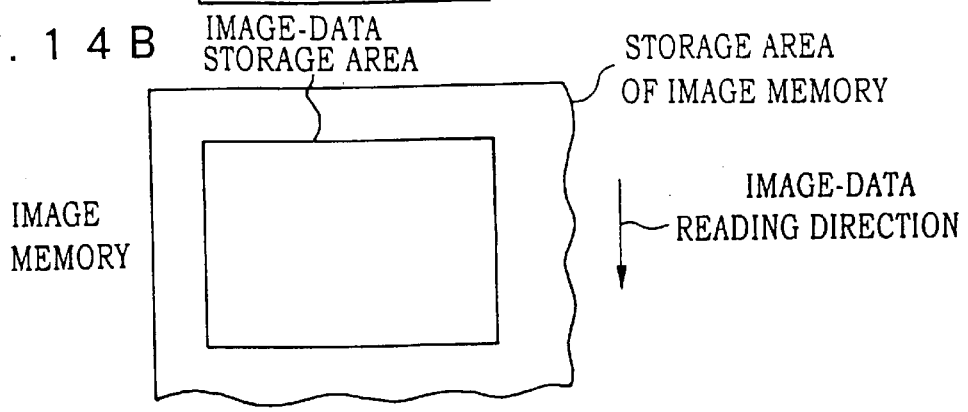
IMAGE-DATA STORAGE AREA
STORAGE AREA OF IMAGE MEMORY
IMAGE MEMORY
IMAGE-DATA READING DIRECTION
F I G. 1 4 C
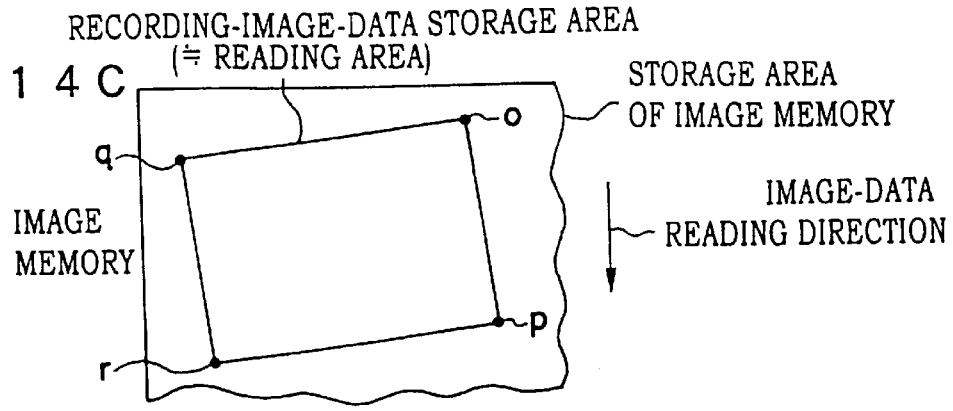
RECORDING-IMAGE-DATA STORAGE AREA (≒ READING AREA)
STORAGE AREA OF IMAGE MEMORY
IMAGE MEMORY
IMAGE-DATA READING DIRECTION
F I G. 1 4 D
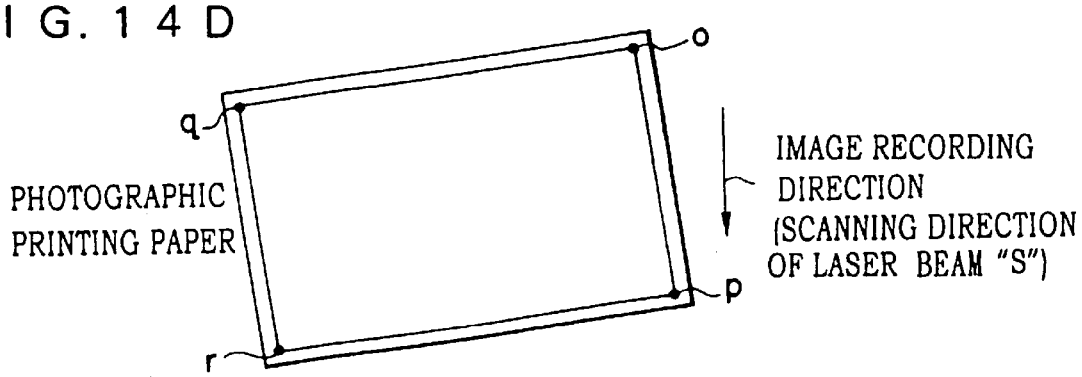
PHOTOGRAPHIC PRINTING PAPER
IMAGE RECORDING DIRECTION (SCANNING DIRECTION OF LASER BEAM "S")

F I G. 1 5
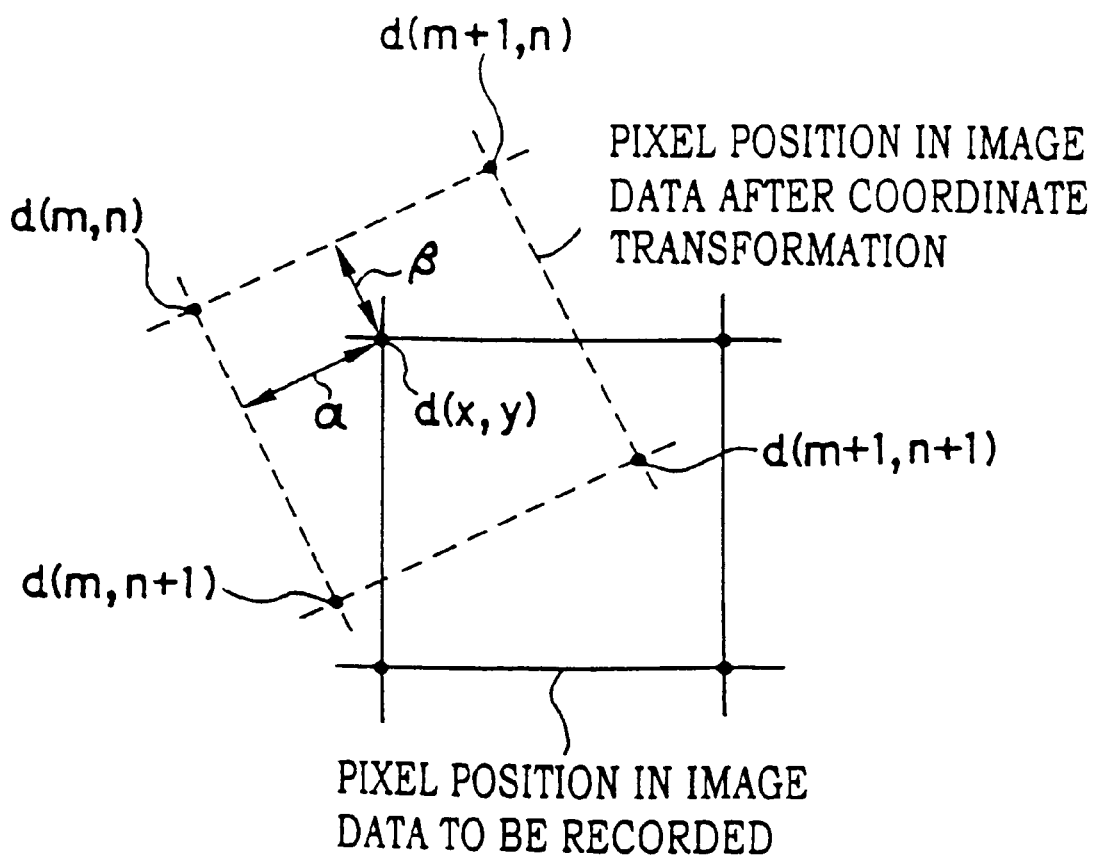

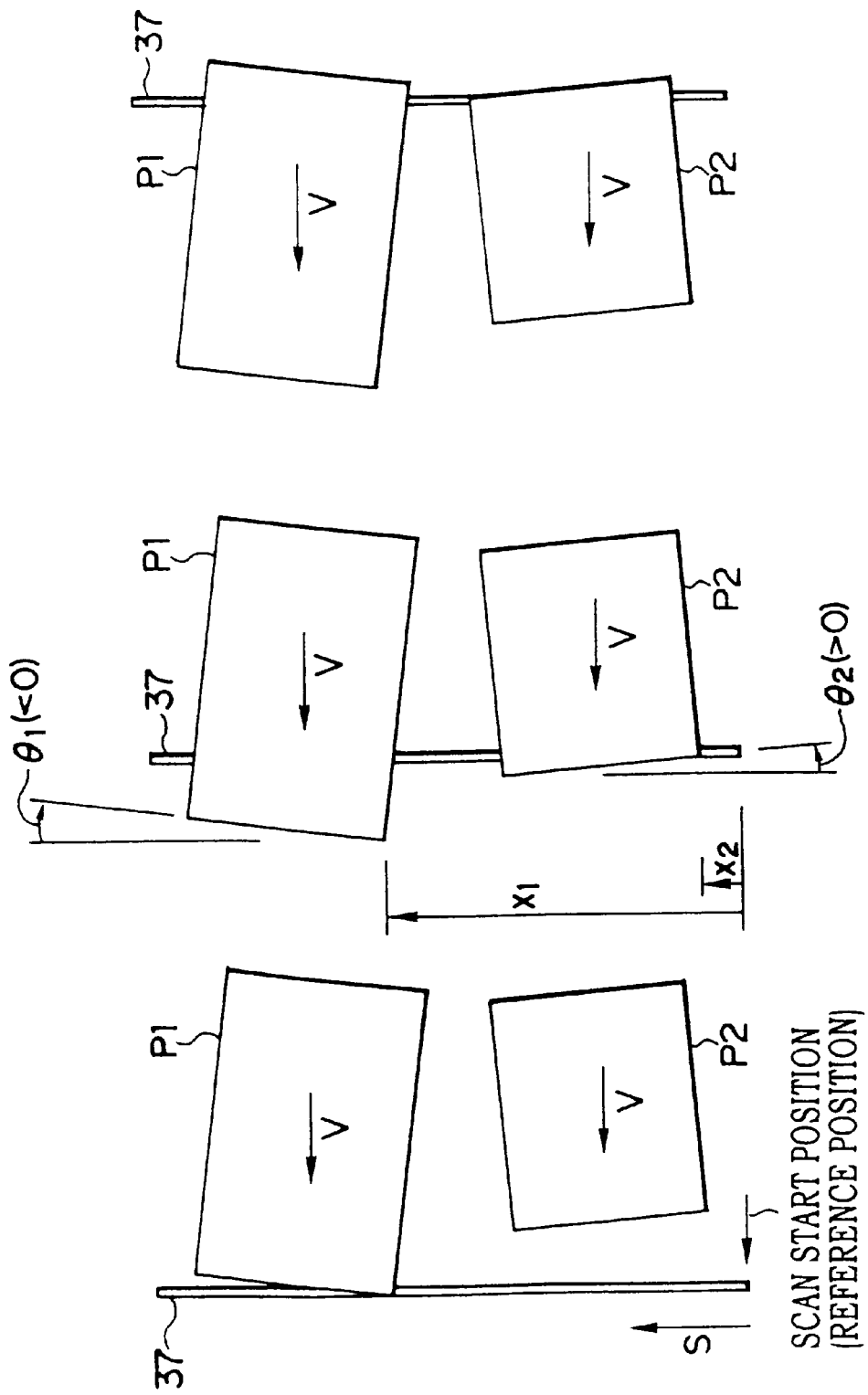

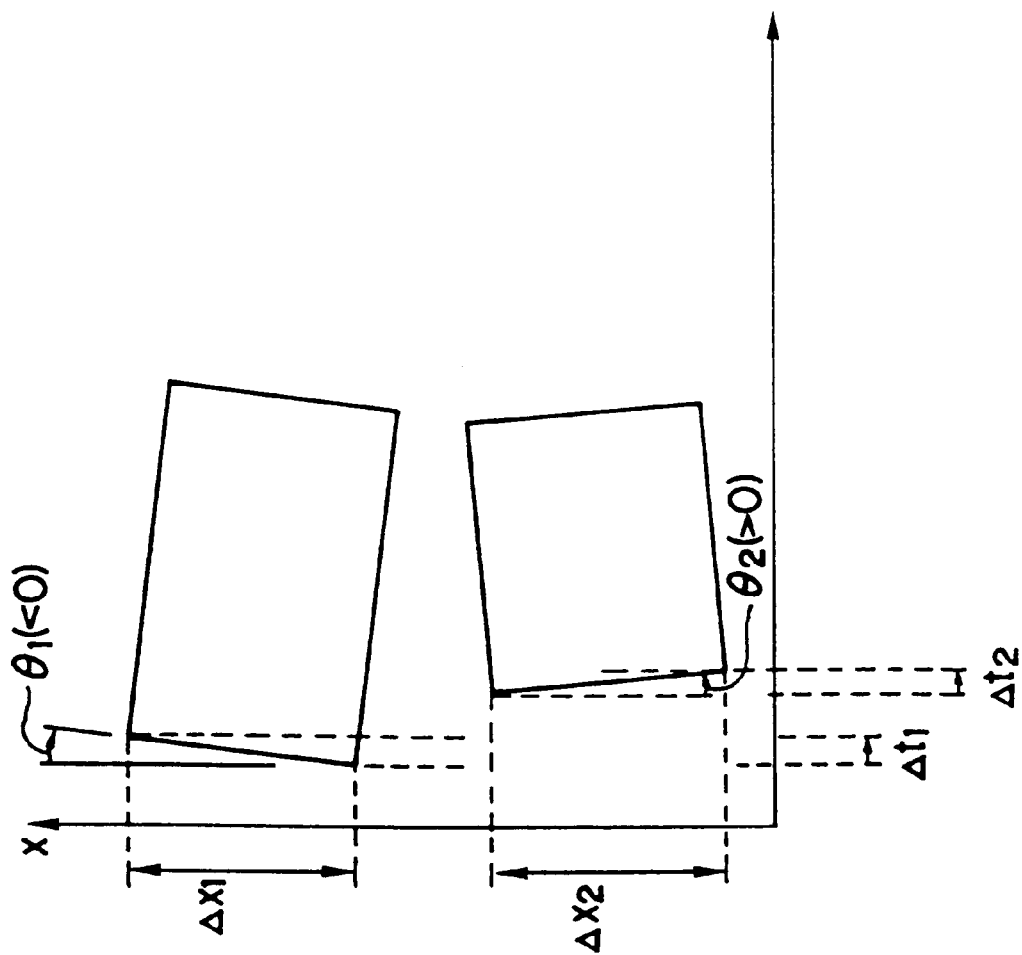

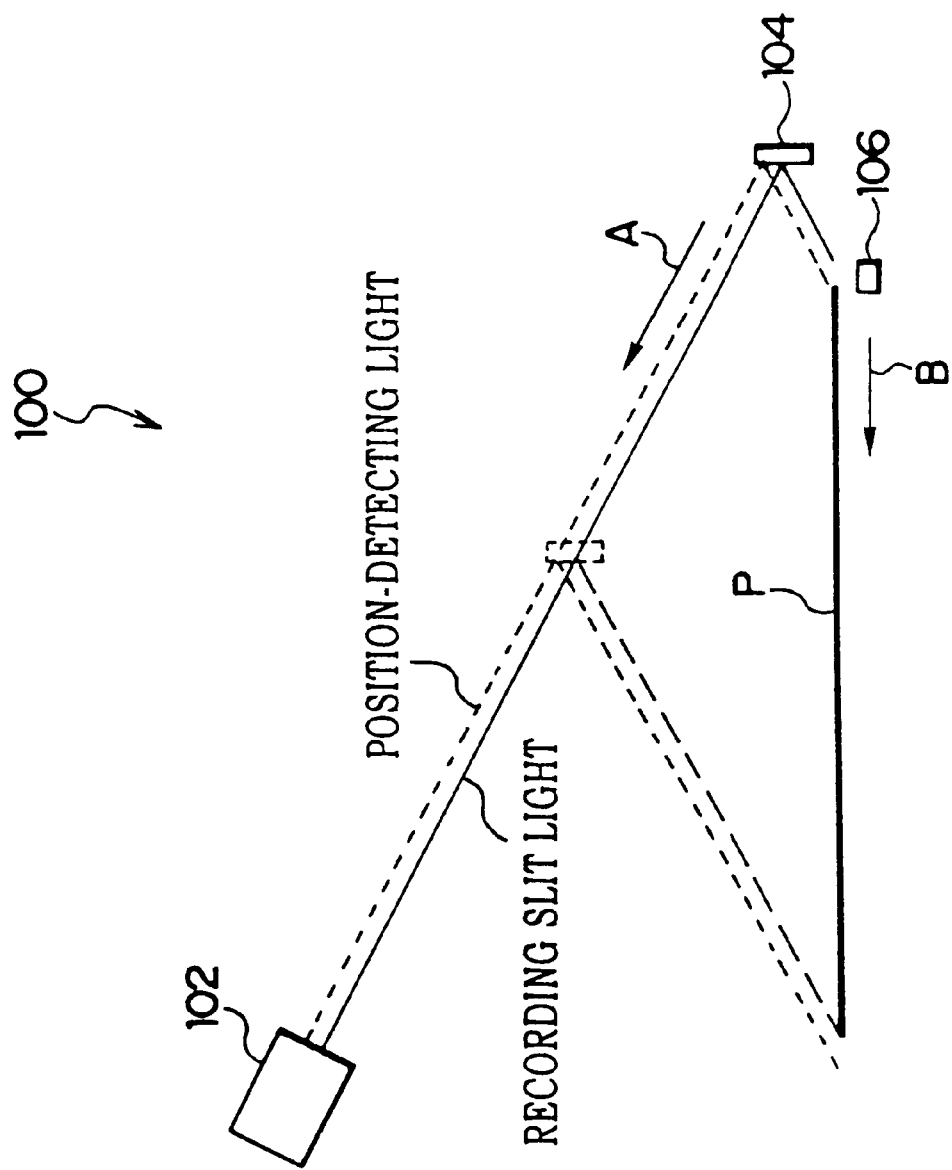

IMAGE RECORDING METHOD

BACKGROUND OF THE INVENTION

1. Field of the Invention

The present invention relates to an image recording method, and particularly to an image recording method in which an image is recorded on a recording material conveyed to a recording section of a photographic printer or the like

2. Description of the Related Art

There has conventionally been known a photographic printer in which a film image recorded on a photographic film such as a negative film is exposed onto a photographic printing paper or the like and a photographic print is prepared. In a photographic printer of this type, an improvement in processing capacity (the number of images recorded per unit time) is an important problem. For this reason, there has conventionally been proposed a photographic printer in which photographic printing papers previously cut in accordance with the size of a photographic print are respectively supplied for a plurality of conveying lines along which the photographic printing papers are conveyed to an exposure section of a photographic printer or the like and a plurality of photographic printing papers conveyed parallel with one another via the conveying lines are exposed in parallel in the exposure section (see Japanese Patent Application Laid-Open Nos. 8-314022, 6-347905, 6-347907, and 6-347914).

On the other hand, when a photographic printing paper cut to a predetermined size is conveyed to and exposed in the exposure section in the same way as in the above-described photographic printer, it is technically very difficult to convey the photographic printing paper, for the exposing operation, so as to be positioned at a fixed location and at a fixed orientation at high accuracy in the exposure section. Optical components of an exposure system are each generally disposed fixedly in the exposure section. Accordingly, when the irradiation range of exposure light (light transmitted through a film image, or laser beam modulated in accordance with a film image) is provided to coincide with the size of the photographic printing paper, there is a possibility that a very noticeable useless unexposed portion is formed on the photographic printing paper (i.e., photographic print) due to the variation in position and orientation of the photographic printing paper during exposure.

For this reason, particularly in a photographic printer in which an image is exposed onto the photographic printing paper that has been cut, exposure light is irradiated, for image exposure, over a region which is greater than that in which exposure light needs to be actually irradiated on the photographic printing paper so as to prevent formation of an unexposed portion on the photographic printing paper, taking into account that the variation in position and orientation of the photographic printing paper during exposure is caused by the fact that the photographic printing paper is located at any position in a predetermined range in which the photographic printing paper is supposed to be located.

Namely, as the format of a photographic print, there exist a "bordered" in which a white border having a fixed width is provided at the outer periphery of an image recording portion of a photographic print and a "no border" in which an image is recorded on the whole surface of the photographic print without providing the white border. When the "no border" is specified as a print format, the photographic printer operates to apply exposure light to a range which is sufficiently greater than the size of the photographic printing paper. On the other hand, when the "bordered" is specified, the region on the photographic printing paper in which light is exposed is made smaller than the size of the photographic printing paper by a print mask that shields the exposure light for an area of the white border, wherein the exposure light is applied to a region which is sufficiently greater than the opening of the print mask to allow exposure of an image.

However, in the foregoing, a part of the exposure light is not applied to a photosensitive material and a part of the film image is not exposed onto the photographic printing paper accordingly. As a result, an image of a finished photographic print results in omission of a part of the film image. For this reason, there exists such a drawback that, when a main subject to be printed is located at a peripheral edge of the film image, a part of the main subject is omitted from the finished photographic print.

Further, in order to solve the above-described drawback, there may be proposed a method in which, particularly when "bordered" is specified as the print format, the exposure light is applied to a region which is smaller than the size of the photographic printing paper without using the print mask. However, when considered that the position and orientation of the photographic printing paper each vary in a case in which images are exposed on photographic printing papers provided in a plurality of lines, it was difficult to set the width of the white border fixedly. Particularly, in the case of the "bordered" photographic print, an unexposed portion is very noticeable on the finished print unless the white border has a fixed width. Accordingly, the above exposure method is not practical.

SUMMARY OF THE INVENTION

In view of the above-described circumstances, it is an object of the present invention to provide an image recording method in which an image can be recorded in such a state that no useless unrecorded portion is formed on a recording material and omission of an image is restrained to the minimum.

A first aspect of the present invention is an image recording method in which an image is recorded on a recording material conveyed to a recording section in a photographic printer or the like, comprising the steps of: detecting a position of the recording material in the recording section; and recording an image on the recording material in such a manner that a position of the range of image data to be recorded is varied to coincide with the detected position of the recording material.

In accordance with one embodiment the invention, the position of the recording material in the recording section is detected, an inclination of the recording material in the recording section is determined based on the detected position, an inclination of a range of image data to be recorded is adjusted based on the determined inclination of the recording material, and further, recording on an image the recording material during the image recording processing in the recording section based on the adjusted range of image data. As a result, as compared with a case in which an image is recorded with the image recording range being located at a fixed position as in the conventional manner, even if the position of the recording material during the image recording processing in the recording section varies, it is unnecessary that an image be recorded in a range which is sufficiently larger than the range in which the image is actually recorded on the recording material so as to prevent formation of an unnecessary unrecorded portion on the recording material. As a result, the unnecessary unrecorded portion is not formed on the recording material and the image recording range is allowed to coincide with or approach to the range in which the image is actually recorded on the recording material as compared with the conventional method. Accordingly, omission of the image on the recording material can be restrained to the minimum.

Meanwhile, the image recording method according to the present invention is particularly effective when the image is recorded on each of the plurality of recording materials conveyed in parallel. Namely, in accordance with another embodiment of the invention the invention, there is provided an image recording method in which an image is recorded on each of a plurality of recording materials conveyed in parallel to a recording section in a photographic printer or the like, comprising the steps of: detecting the position of each of the plurality of recording materials in the recording section; and recording an image on each of the plurality of recording materials by varying the position of a range of image data to be recorded on each of the plurality of recording materials correspondingly to the detected position of each of the plurality of recording materials.

In accordance with an aspect of the invention, the position of each of the plurality of recording materials in the recording section is detected and the position of the image recording range for each of the plurality of recording materials is varied to correspond to the detected position of each of the plurality of recording materials. As a result, an unnecessary unrecorded portion is not formed on each of the recording materials conveyed in parallel and an image can be recorded on each of the recording material with omission of the image on each recording material being restrained to the minimum.

Meanwhile, when the orientation of the recording material during image recording processing is fixed at high accuracy, omission of the image can be sufficiently restrained only by varying the image recording range as described above. However, when the orientation of the recording material during image recording processing varies widely, even if only the position of the image recording range is varied, it is necessary that, by taking account of a variation of orientation of the recording material, an image is stored in a range which is slightly larger than the range in which an image is actually recorded on the recording material to prevent formation of the unnecessary unrecorded portion on the recording material. In this case, it is not possible to sufficiently restrain omission of the image on the recording material.

In accordance with an aspect of the invention, the inclination of the recording material is detected and the inclination of the image recording range is varied to correspond to the detected inclination of the recording material. For this reason, the size of the image recording range is allowed to coincide with the range in which an image is actually recorded on the recording material. Accordingly, even when the orientation of the recording material during image recording processing varies widely, an unnecessary unrecorded portion is not formed on the recording material and omission of an image on the recording material can be restrained to the minimum.

Regarding the above, the present invention can be applied to a case in which an image is recorded on a recording material in a so-called analog system in which an image is recorded on a recording material due to the light transmitted through or reflected by an original image recorded on a recording medium being irradiated onto the recording material (or an image to be transferred to the recording material is formed due to the transmitted or reflected light being irradiated onto another recording medium and the formed image is transferred to the recording material), and can also be applied to a case in which an image is recorded on a recording material based on image data which indicates an image to be recorded (a so-called digital system).

An image recording operation using a digital system is generally effected in such a manner that image data which indicates an image to be recorded is stored in storage means such as a memory, the image data is read out from the storage means in a fixed reading order, and based on the read image data, the image is recorded in a fixed recording direction. For applying the present invention to a digital image recording operation, there exist problems in that: the process becomes extremely complicated when variation of the reading order is required; and the device structure becomes extremely complicated when variation of the recording direction during image recording processing (i.e., the direction in which dots are arranged during image recording processing) is required.

For this reason, according to another embodiment of the invention is an image recording method in which image data stored in storage means is read in a fixed reading direction, and an image is recorded in a recording range in a fixed recording direction based on the read image data and is recorded on a recording material conveyed to a recording section in a photographic printer or the like, which method comprising the steps of: detecting an inclination of the recording material in the recording section; reading image data by effecting either an operation in which based on the detected inclination of the recording material and the reading and recording directions, an area in which image data is read from the storage means is varied to coincide with the detected inclination of the recording material, or an operation in which the image data stored in the storage means is processed to correspond to the detected inclination of the recording material; and recording an image on the recording material based on the read image data.

In accordance with an aspect of the invention, the inclination of the recording material in the recording section is detected, and based on the detected inclination of the recording material, the reading direction of image data, and the recording direction during image recording processing, at least one of the operation, in which the area in which image data is read from the storage means is varied to correspond to the detected inclination of the recording material and the operation in which the image data stored in the storage means is processed to correspond to the detected inclination of the recording material, is effected, and as a result, the image data is read.

Meanwhile, as the operation for varying the area in which image data is read from the storage means, for example, there can be used the operation for setting the image data reading area so that the image data reading area (when a storage region of the storage means is conceptually shown in plan, the image data reading area is conceptually shown as a rectangular area on the plane) is inclined with respect to the image data reading direction by an amount of inclination of the recording material with respect to the recording direction during image recording processing. Further, as the operation for processing the image data stored in the storage means, it is represented by an operation in which data which corresponds to other area than the inclined image data reading area is eliminated from the image data stored in the storage means.

In the foregoing, so long as the image data is read out from the storage means in the fixed reading direction and based on the read image data, the image is recorded in a fixed recording direction, the image is recorded correspondingly to the inclination of the recording material. Thus, according to an aspect of the invention, when the image is recorded based on the image data, the unnecessary unrecorded portion is not formed on the recording material and omission of the image on the recording material can be restrained to the minimum without the process and the device structure being made extremely complicated.

Meanwhile, when the position of the recording material in the recording section varies widely, the position of the image recording range may be varied in accordance with the detected position of the recording material in the recording section, or the position of the image data reading area may be varied in accordance with the detected position.

Further, in the above-described operation which is shown as an example of the operation in which the area in which image data is read from the storage means is varied and the operation in which the image data stored in the storage means is processed, the arrangement of pixels represented by the image data on the storage means does not vary. Accordingly, when the recording material is inclined with respect to the recording direction during image recording processing, the longitudinal direction of the image to be recorded on the recording material is inclined by an amount of inclination of the recording material. The inclination in the longitudinal direction of the image is not recognized so long as the amount of deviation is small. However, when the orientation of the recording material varies widely, a recording material inclined relatively largely to the recording direction during image recording processing may exist. Due to the fact that the longitudinal direction of the image to be recorded on the recording material is inclined relatively largely, the inclination in the longitudinal direction of the image may be apparently recognized.

In the above-described case, as the operation for processing the image data stored in the storage means, preferably, coordinates of each of pixels of image data is transformed so that the direction in which the pixels represented by the image data on the storage means are arranged is inclined with respect to the reading direction by an amount of inclination of the recording material with respect to the recording direction during image recording processing and the image data thus obtained is re-stored in the storage means. As a result, the longitudinal direction of the image to be recorded on the recording material complies with the amount of inclination of the recording material with respect to the recording direction during image recording processing (which means that it coincides with the orientation of the recording material). For this reason, even when the orientation of the recording material varies extremely widely, an image of high quality in which the longitudinal direction of the image coincides with the orientation of the recording material can be recorded.

Meanwhile, detection of at least one of the position and inclination of the recording material is, effected in such a manner that the detecting light is irradiated onto the recording material and the position where the detecting light is irradiated is moved, and thereafter a timing at which the detecting light is reflected or shut out by the recording material is detected.

Further, the position of the recording material can also be detected by applying the detecting light onto the recording material and detecting the amount of the light which is not reflected or shut out by the recording material or the light reflected or shut out by the recording material.

Meanwhile, when an image is recorded on a recording material by applying recording light modulated in accordance with an image to be recorded and moving the position where the recording light is irradiated on the recording material, so long as the position where the detecting light is irradiated on the recording material is moved, each distribution position of the recording light and the detecting light can be moved by the same light distribution means and the position where the detecting light is irradiated can be moved without the device structure being made complicated.

On the other hand, the photosensitive material has characteristics of color density to an amount of exposure which varies depending upon the temperature thereof. For this reason, when the photosensitive material is used as the recording material, a finished state such as density of an image recorded on the recording material varies widely in accordance with the temperature of the recording material which varies under the influence of the ambient temperature in the recording section. For this reason, in accordance with the invention, the recording material is the photosensitive material and the detecting light is infrared light, and is characterized in that at least one of the temperature of the recording material and the temperature of the recording section is detected, and based on the detected temperature, the intensity of the detecting infrared light is varied, and further, the detecting infrared light is applied onto the whole surface of the recording material.

In accordance with various aspects of the invention, at least one of the temperature of the recording material and the temperature of the recording section is detected by using infrared light as the detecting light, and based on the detected temperature, the intensity of the detecting infrared light is varied, and further, the detecting infrared light is applied onto the whole surface of the recording material. For this reason, even if the temperature of the recording section or the temperature of the photosensitive material as the recording material varies, the temperature of the photosensitive material during image recording processing can be set at a substantially fixed value across the whole surface. Accordingly, when the photosensitive material is used as the recording material, a recorded image in a substantially fixed finished state can be obtained regardless of variation of the ambient temperature, and the like.

BRIEF DESCRIPTION OF THE DRAWINGS

FIG. 7A is a perspective view of an infrared light sensor, and FIG. 7B is a cross sectional view of an optical guide of the infrared light sensor.

FIG. 8 is a schematic block diagram which shows a controller and peripheral devices thereof.

FIG. 9 is a flow chart which shows an operation in which an image is exposed and recorded on a photographic printing paper.

FIGS. 10A through 10F are plan views which show, in time sequential manner, a state in which a photographic printing paper is conveyed aslant.

FIG. 11A is a timing chart which shows an example of a variation in the amount of infrared light received by the infrared light sensor, and FIG. 11B is a conceptual diagram for illustrating a calculation of inclination θ of the photographic printing paper.

FIG. 12A shows an original image data; FIG. 12B shows an image data reading area when a photographic printing paper is not inclined; FIG. 12D shows an image data reading area when the photographic printing paper is inclined; FIG. 12C shows an image recording area when the photographic printing paper is not inclined; and FIG. 12E shows an image recording area when the photographic printing paper is inclined.

FIGS. 13A and 13C each show another example of the image data reading area when the photographic printing paper is inclined; and FIGS. 13B and 13D each show the image recording area when the photographic printing paper is inclined.

FIGS. 14A through 14D are each an imaginary diagram: FIG. 14A shows an original image data; FIG. 14B shows an image data recording area; FIG. 14C shows a storage area of recording image data which is re-stored when the photographic printing paper is inclined; and FIG. 14D shows an image recording area when the photographic printing paper is inclined.

FIG. 15 is a conceptual diagram for illustrating processing for obtaining a density value of each of pixels in the recording image data.

FIGS. 16A through 16C are plan views which show in time sequential manner the state in which a plurality of photographic printing papers are conveyed aslant in parallel.

FIG. 17 is a conceptual diagram for illustrating a calculation of inclination θ of each of the plurality of photographic printing papers when the photographic printing papers are conveyed in parallel.

FIG. 18 is a schematic structural diagram which shows another example of an image recording device to which the present invention is applied.

DESCRIPTION OF THE PREFERRED EMBODIMENTS

Figure 1:
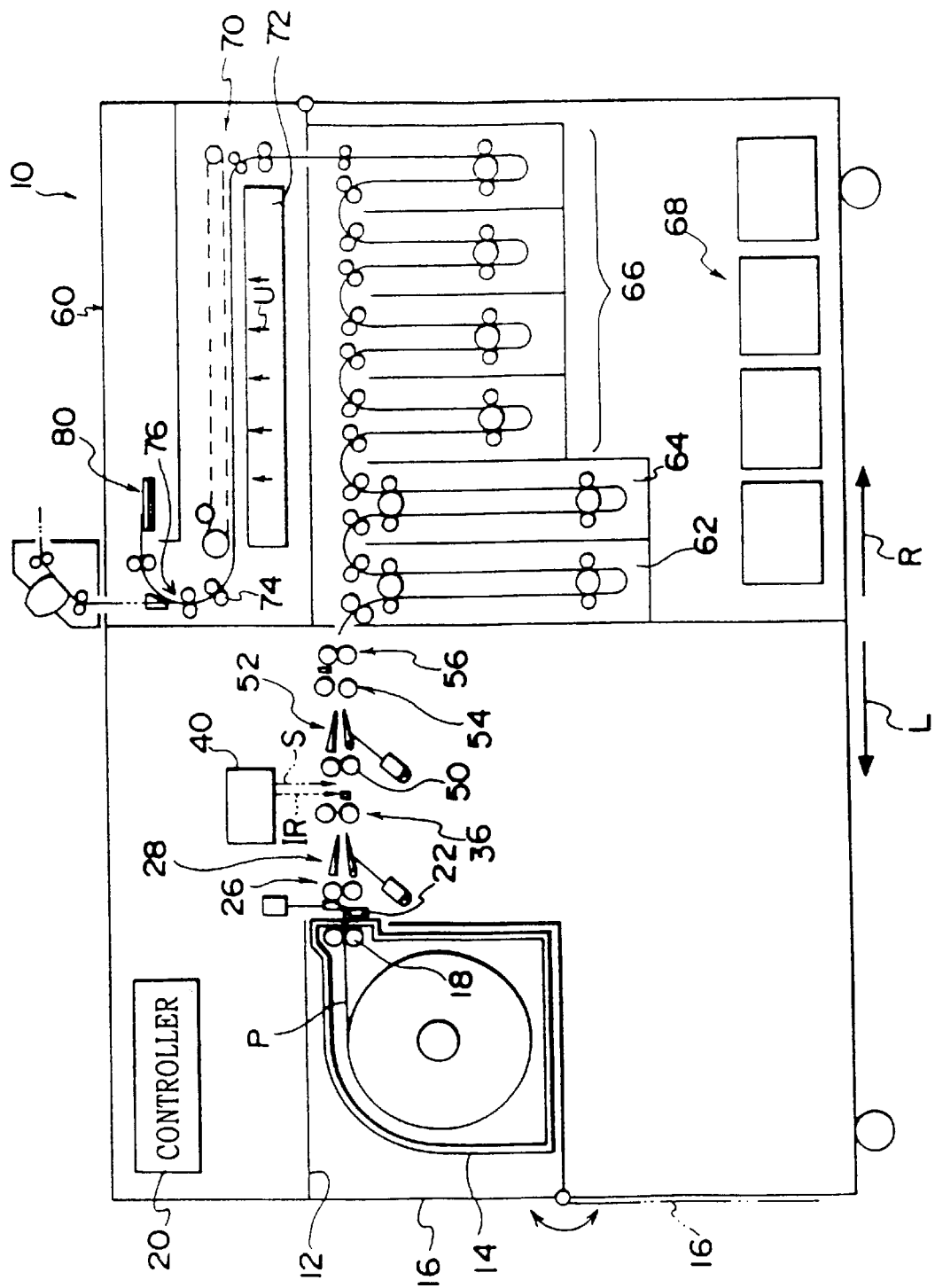
FIG. 1 is a schematic structural diagram of a printer processor according to an embodiment of the present invention.

Referring now to the attached drawings, an embodiment of the present invention will be described in detail. FIG. 1 shows a printer processor 10 to which the present invention is applied. A magazine containing portion 12 is provided within the printer processor 10 at the side of the direction indicated by arrow L in FIG. 1 and a magazine 14 in which a roll-shaped photographic printing paper P (corresponding to a recording material of the present invention) is loaded in the magazine containing portion 12. The magazine 14 is allowed to be loaded and removed with a door 16 of the magazine containing portion 12 being opened.

In the printer processor 10, a conveying path of the photographic printing paper P is set such that the transverse dimension thereof is made larger to make it possible to process the photographic printing papers P having various different transverse dimensions. The magazine containing portion 12 allows loading, for example, one magazine 14 in which a photographic printing paper P having a large transverse dimension is loaded (see FIG. 2), three magazines 14 in which photographic printing papers P each having a small transverse dimension are respectively loaded (see FIG. 3), or two magazines 14 in which photographic printing papers P each having a medium transverse direction are respectively loaded (see FIG. 4).

Figure 5:
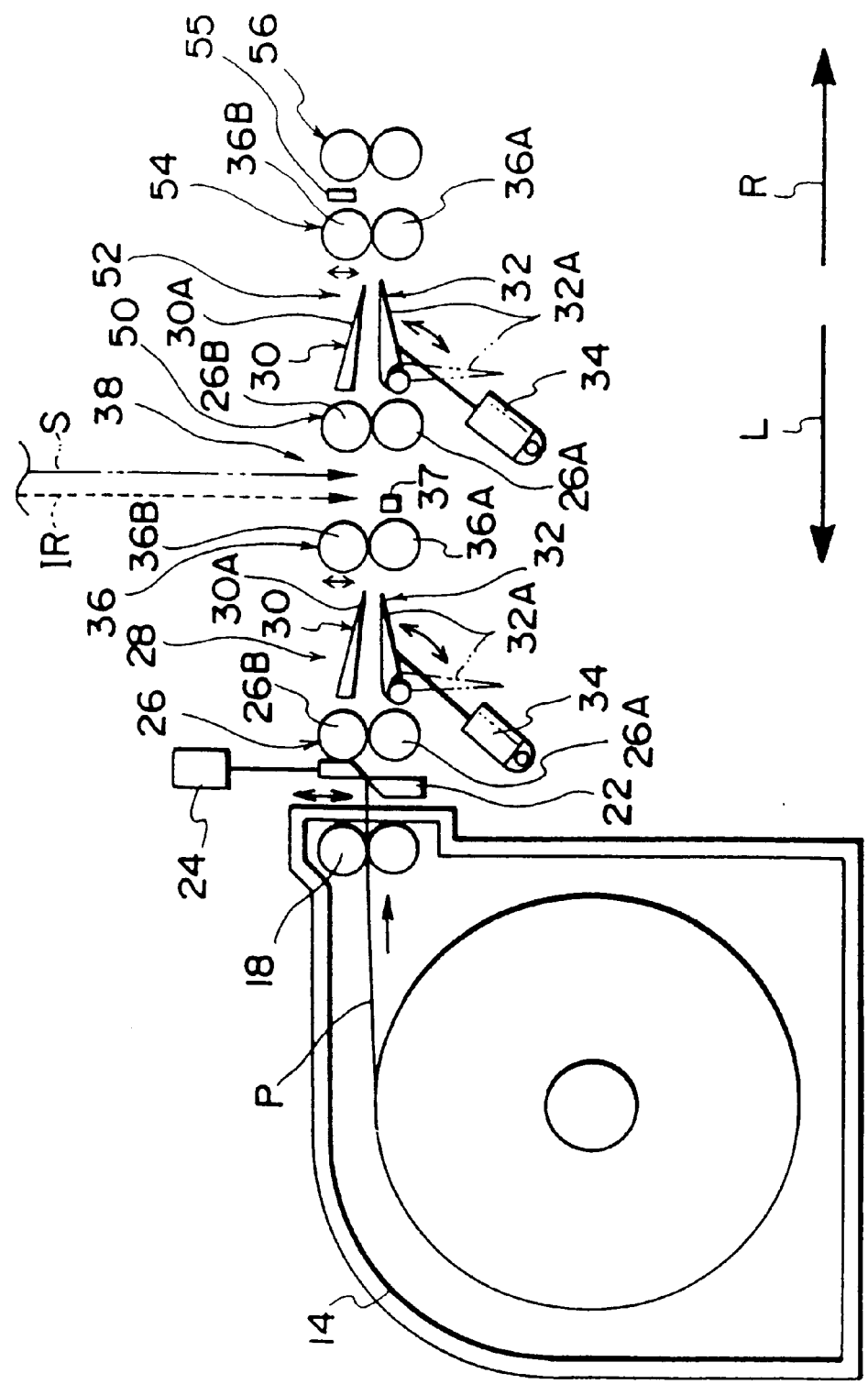
FIG. 5 is a cross sectional view which shows a conveying path of a photographic printing paper from a magazine containing portion to the position just before a processor section.

As shown in FIG. 5, delivery rollers 18 which are used to send the photographic printing paper P out of the magazine 14 are provided within the magazine 14 in the vicinities of an exit of the photographic printing paper P. The delivery rollers 18 rotate due to transmission of driving force from a drive source (not shown) outside the magazine 14 and sends out the photographic printing paper P in the direction indicated by arrow R in FIG. 5. The drive source is provided to correspond to each of the magazines and the operation thereof is controlled by a controller 20 (see FIG. 1) provided within the printer processor 10. Accordingly, in the printer processor 10, when a plurality of magazines 14 are loaded in the magazine containing portion 12, the plurality of photographic printing papers P can be conveyed in parallel.

Figure 2:
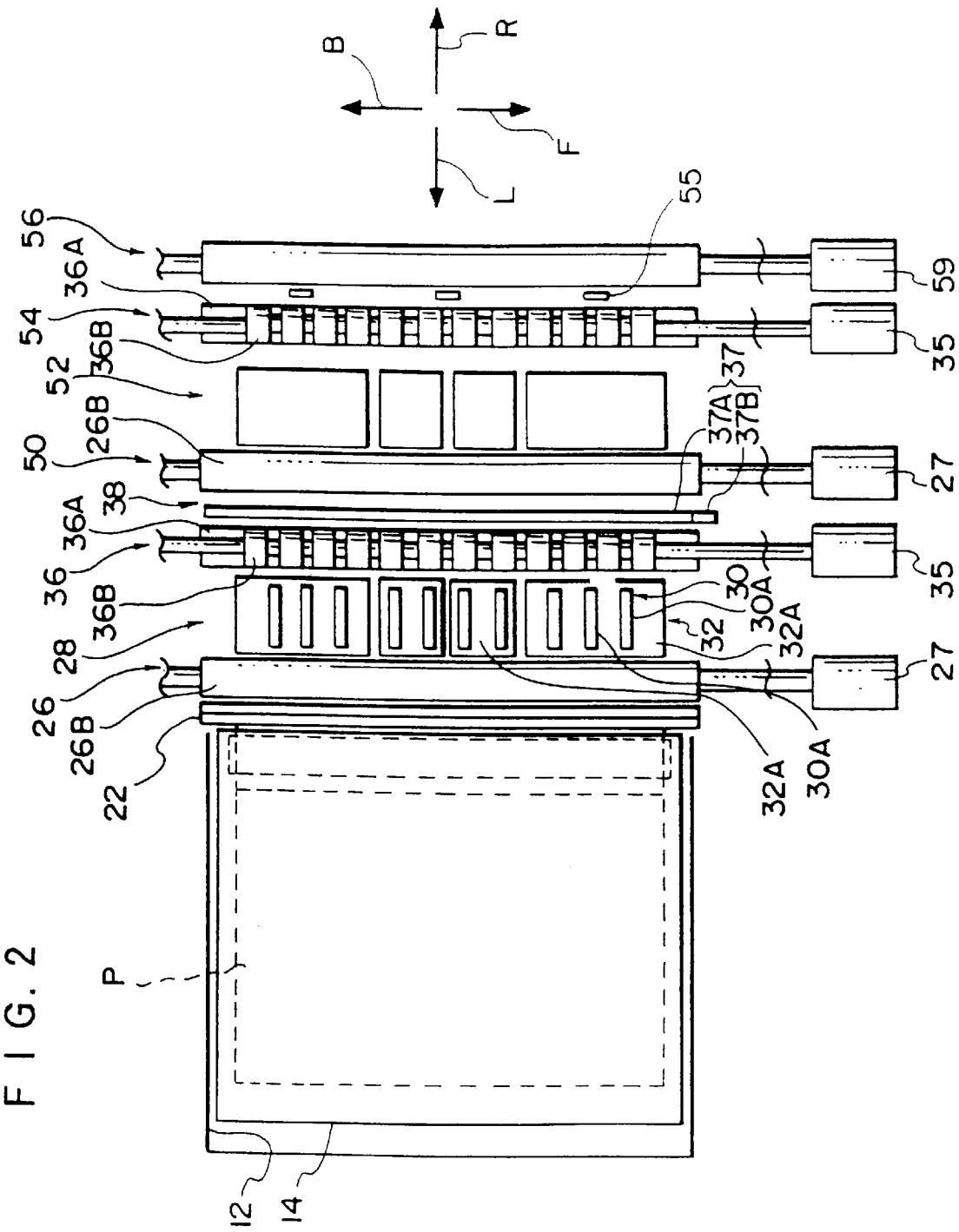
FIG. 2 is a plan view which shows a conveying path of a photographic printing paper from a magazine containing portion to the position just before a processor section when one magazine which contains a photographic printing paper having a large transverse dimension is provided.
Figure 3:
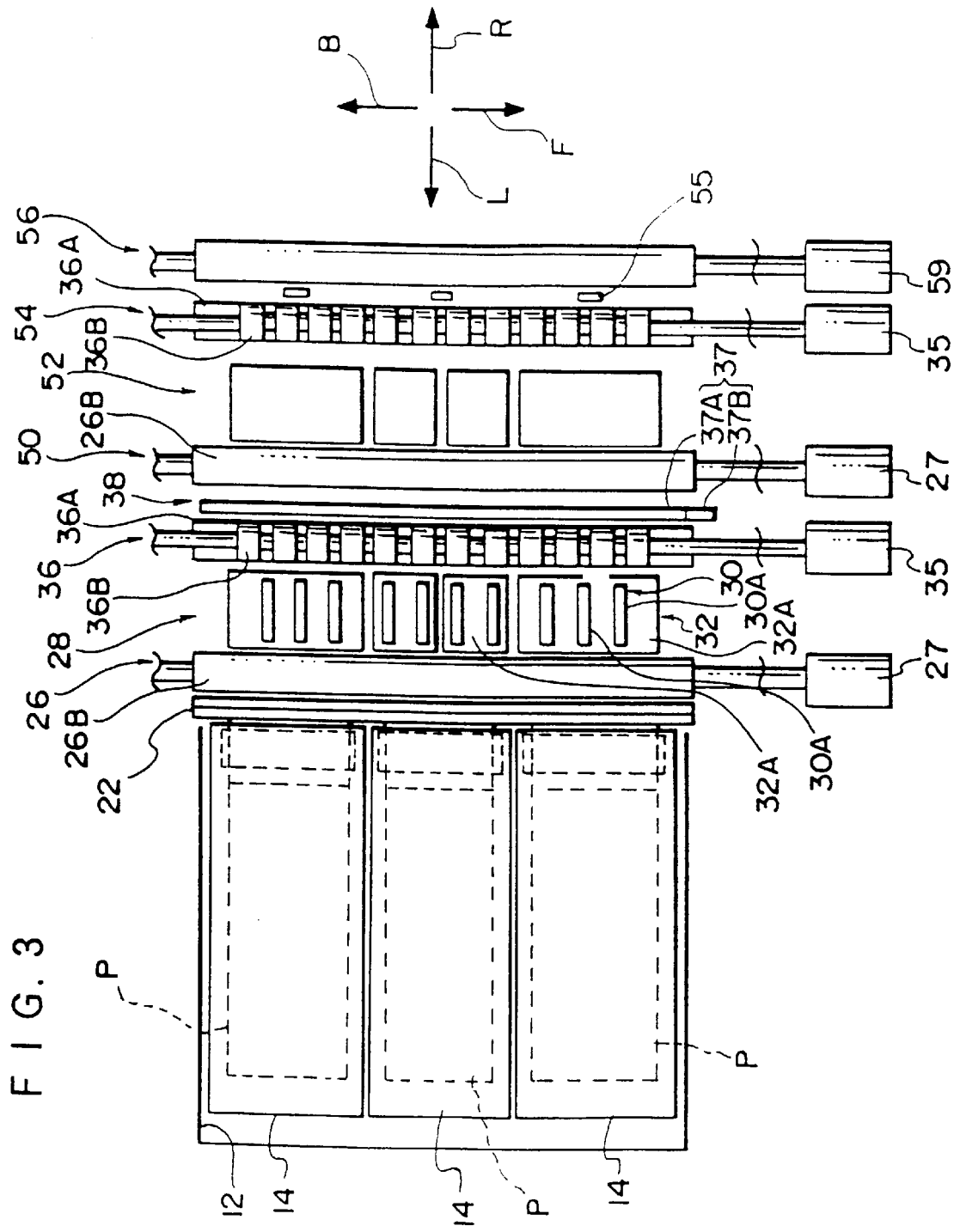
FIG. 3 is a plan view which shows a conveying path of a photographic printing paper from a magazine containing portion to the position just before a processor section when three magazines each containing a photographic printing paper having a small transverse dimension are provided.
Figure 4:
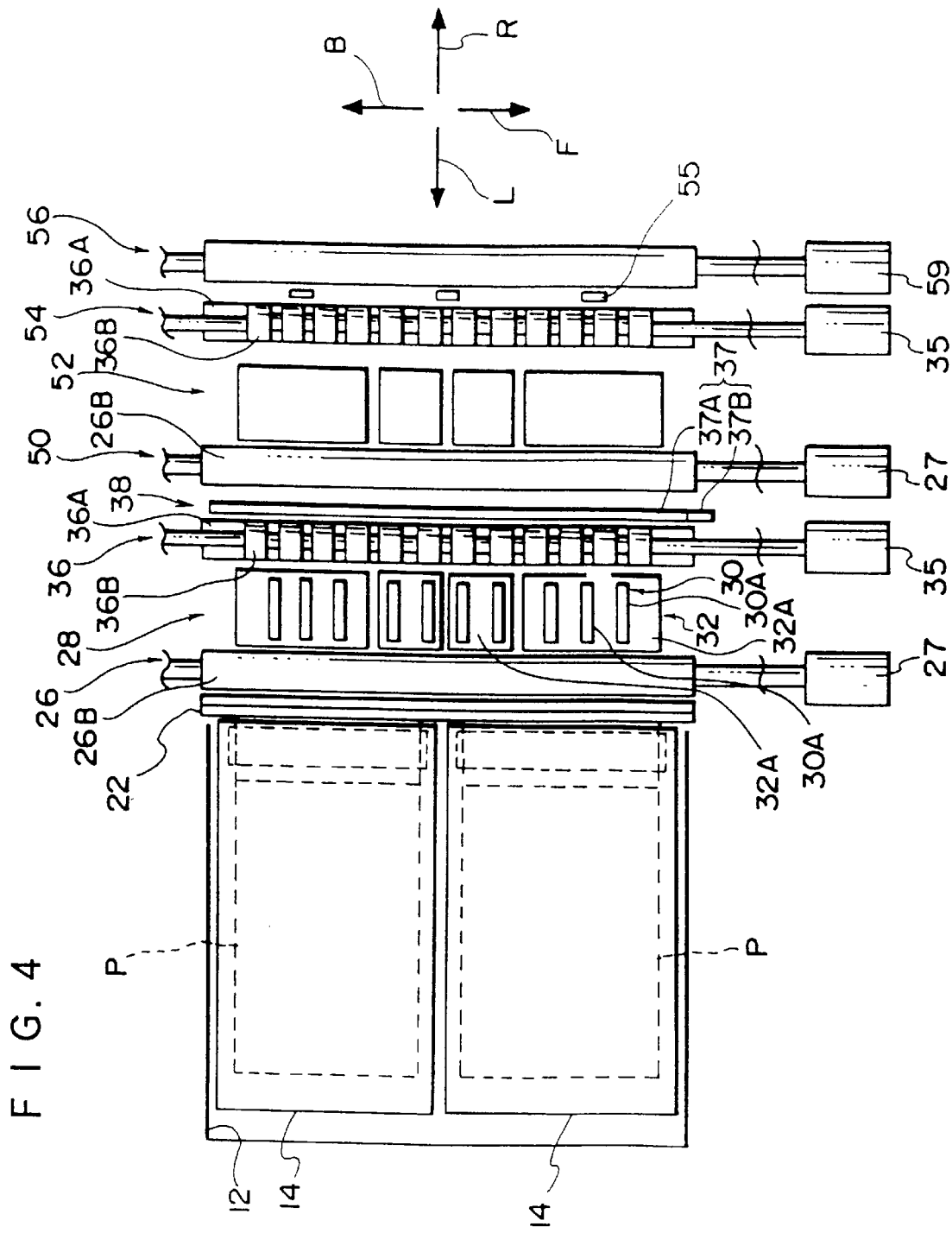
FIG. 4 is a plan view which shows a conveying path of a photographic printing paper from a magazine containing portion to the position just before a processor section when two magazines each containing a photographic printing paper having a medium transverse dimension are provided.

As shown in FIGS. 2 to 4, a cutter 22 is disposed at the downstream side of the magazine 14 in the direction in which the photographic printing paper P is conveyed and the longitudinal direction of the cutter 22 coincides with the transverse direction of the photographic printing paper P (i.e., the directions indicated by arrows F and B in FIGS. 2 to 4). As shown in FIG. 5, the cutter 22 is driven by a cutter driving device 24 to allow the photographic printing papers P conveyed in multiple lines to be cut substantially simultaneously. The operation of cutter driving device 24 is controlled by the above-described controller 20.

As shown in FIGS. 3 and 5, a first conveying roller pair 26 formed from one lower roller 26A and one upper roller 26B is provided at the downstream side of the cutter 22 in the direction in which the photographic printing paper P is conveyed. The lower roller 26A is made longer than the transverse dimension of the conveying path of the photographic printing paper P and rotates due to a driving force transmitted thereto by a motor 27, whose operation is controlled by the controller 20. The upper roller 26B is a driven roller.

A first accumulator 28 is provided at the downstream side of the first conveying roller pair 26 in the direction in which the photographic printing paper P is conveyed. The first accumulator 28 includes an upper lever group 30 disposed above the conveying path of the photographic printing paper P and a guide group 32 disposed below the conveying path of the photographic printing paper P. As shown in FIG. 3, the upper lever group 30 is formed in such a manner that a plurality of small levers 30A each extending along the direction in which the photographic printing paper P is conveyed are arranged along the transverse direction of the photographic printing paper P. The guide group 32 is formed in such a manner that a plurality of guide members 32A is arranged along the transverse direction of the photographic printing paper P. In the present embodiment, two narrow guide members 32A are provided at a central portion in the transverse direction of the conveying path of the photographic printing paper P and a wide guide member 32A is provided at each of both sides of the narrow guide members 32A.

As shown in FIG. 2, when a wide photographic printing paper P is conveyed, four guide members 32A correspond to the photographic printing paper P. When narrow photographic printing papers of three lines are conveyed as shown in FIG. 3, two narrow guide members 32A correspond to the central photographic printing paper P and the wide guide members 32A respectively correspond to the photographic printing papers P on both sides of the conveying path. Further, when the photographic printing papers P of medium width are conveyed in two lines, one narrow guide member 32A and one wide guide member 32A at each side of the conveying path correspond to each of the photographic printing papers P.

As shown in FIG. 5, a drive source 34 is connected to each of the guide members 32A. Each of the guide members 32A is driven to rotate by the drive source 34 with an end portion thereof at the side of the first conveying roller pair 26 serving as a pivot and is positioned in a horizontal state indicated by the solid line or in a vertical state indicated by the imaginary line (two-dot chain line) in FIG. 5. Each of the drive sources 34 is controlled by the controller 20.

As shown in FIGS. 1 through 5, a second conveying roller pair 36 is provided at the downstream side of the first accumulator 28 in the direction in which the photographic printing paper P is conveyed. The second conveying roller pair 36 is formed from one lower roller 36A and a plurality of upper rollers 36B disposed along the axial direction of the lower roller 36A. The lower roller 36A is made longer than the transverse direction of the conveying path of the photographic printing paper P and rotates due to transmission of driving force of the motor 35 whose operation is controlled by the controller 20. The upper rollers 36B are provided to move in the vertical direction by driving means (not shown), the operation of which is controlled by the controller 20.

As shown in FIGS. 2 through 4, a third conveying roller pair 50 is provided at the downstream side of the second conveying roller pair 36 in the direction in which the photographic printing paper P is conveyed. The third conveying roller pair 50 has the same structure as that of the first conveying roller pair 26 and the same members as those of the first conveying roller pair 26 will be denoted by the same reference numerals. An exposure section 38 (corresponding to a recording section of the present invention) is provided between the second conveying roller pair 36 and the third conveying roller pair 50. As shown in FIG. 1, a scan/exposure device 40 is provided above the exposure section 38.

Figure 6:
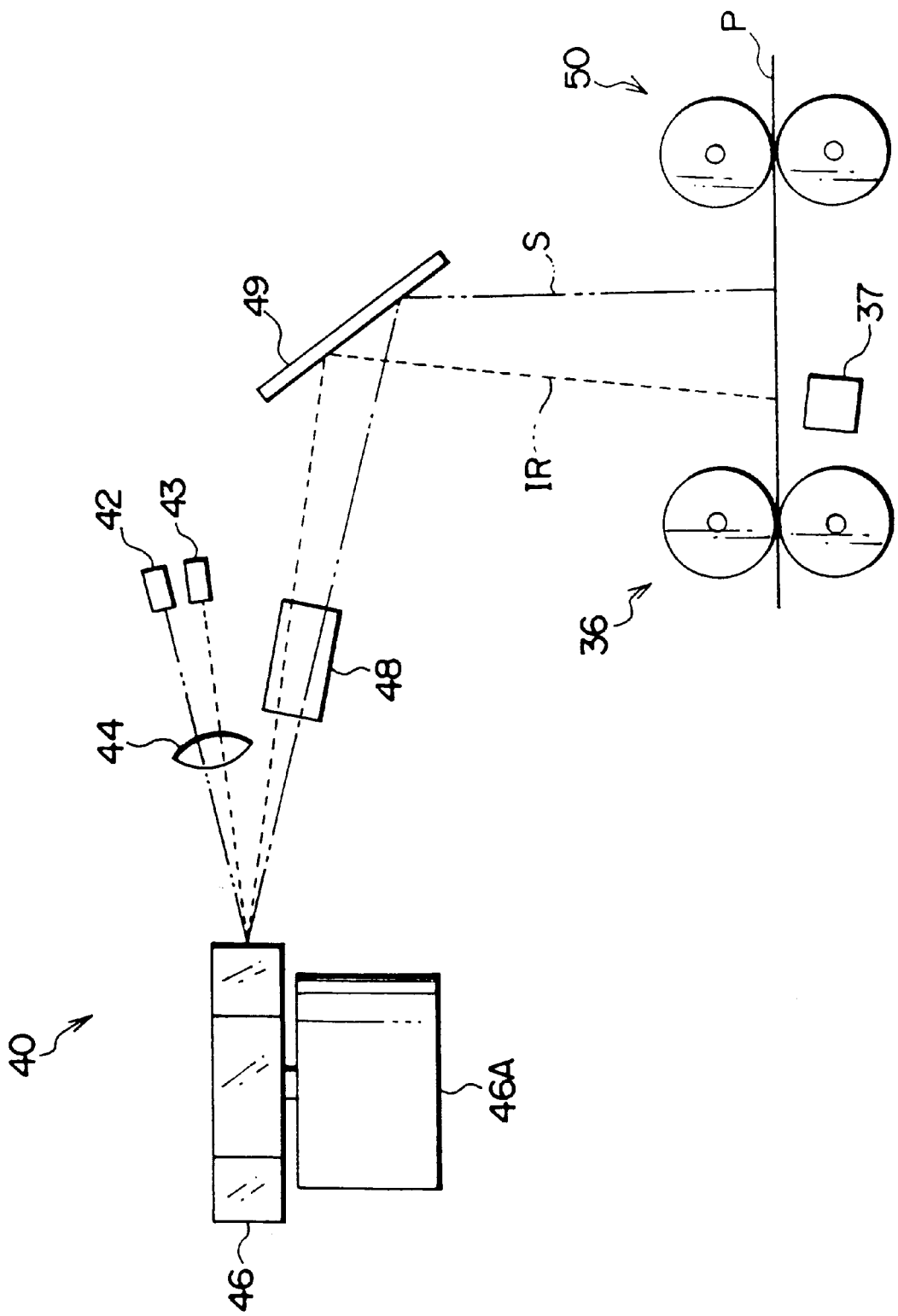
FIG. 6 is a schematic structural diagram of a scan/exposure device.

As shown in FIG. 6, the scan/exposure device 40 includes three laser oscillators 42 (in FIG. 6, only one laser oscillator 42 is shown) which emit laser beams for image recording processing having different wavelengths (laser beams of R, G, and B) and an infrared lamp 43 which emits infrared light (indicated by the broken line in FIG. 6). A condensing lens system 44 and a polygon mirror 46 (corresponding to light distribution means described in claims 11, 14) are disposed sequentially at the side where light is emitted from the laser oscillator 42 and the infrared lamp 43. The laser beam emitted from the laser oscillator 42 (indicated by the two-dot chain line in FIG. 6) and infrared light emitted from the infrared lamp 43 (indicated by the broken line in FIG. 6) are made incident on a reflecting surface of the polygon mirror 46 via the condensing lens system 44.

The polygon mirror 46 is driven to rotate by a motor 46A and the incident laser beam and infrared light are used to scan the photographic printing paper P along the direction perpendicular to the conveying direction of the photographic printing paper P (main scanning). A scanning lens system 48 and a reflecting mirror 49 are disposed sequentially at the side where light is emitted from the polygon mirror 46. The scanning lens system 48 is formed from an fθ lens or the like and allows the laser beam to be imaged on the photographic printing paper P. The laser beam reflected by the reflecting surface of the polygon mirror 46 is transmitted through the scanning lens system 48, reflected by the reflecting mirror 49, and is emitted, as an exposing laser beam S, from the scan/exposure device 40 to the exposure section 38, and is further scanned along the direction perpendicular to the conveying direction of the photographic printing paper P in accordance with the rotation of the polygon mirror 46.

Further, the infrared light reflected by the reflecting surface of the polygon mirror 46 is transmitted through the scanning lens system 48 and is reflected by the reflecting mirror 49 toward the exposure section 38. As shown in FIG. 6, the laser oscillator 42 and the infrared lamp 43 are disposed such that the laser beam and the infrared light are made incident on the reflecting surface of the polygon mirror 46 along the direction perpendicular to the main scanning direction separately off at a predetermined angle. For this reason, an angle of emission of the infrared light from the polygon mirror 46 and an angle of incidence of the infrared light on the reflecting mirror 49 are different from those of the laser beam. The infrared light reflected by the reflecting mirror 49 toward the exposure section 38 is emitted, as position-detecting infrared light IR, from the scan/exposure device 40 toward the upstream side, in the conveying direction of the photographic printing paper P, of the direction in which the exposing laser beam S is emitted, and is further scanned along the direction perpendicular to the conveying direction of the photographic printing paper P in accordance with the rotation of the polygon mirror 46.

As shown in FIG. 5, an infrared light sensor 37 is disposed in the exposure section 38 at a position on an optical path of the position-detecting infrared light IR and below the conveying path of the photographic printing paper P. As shown in FIG. 7A, the infrared light sensor 37 is formed by an optical guide 37A and a phototransistor 37B. The optical guide 37A is formed in the shape of a rod and is disposed such that the longitudinal direction thereof coincides with the transverse direction of the conveying path of the photographic printing paper P and the phototransistor 37B is mounted at one end of the optical guide 37A and has sensitivity to infrared light.

The optical guide 37A is formed by a transparent member of acrylic material or the like. As shown in FIG. 7B, the optical guide 37A has the cross-sectional configuration in which a part of the circumference thereof is cut linear (in the shape of a semicircle) to form a flat surface portion which extends along the longitudinal direction of the optical guide thereon. The optical guide 37A is disposed in such a manner that the position-detecting infrared light IR is made incident on the flat surface portion substantially perpendicularly. Further, an external surface of the optical guide 37A not including the flat surface portion is formed as a mirror by which light to be emitted from an interior of the optical guide 37A is reflected toward the interior of the optical guide 37A. As a result, the position-detecting infrared light IR made incident on the optical guide 37A via the flat surface portion is guided to be made incident on the phototransistor 37B even if the position where the infrared light IR is made incident is located at any position along the longitudinal direction of the optical guide 37A.

In order to prevent unnecessary and ununiform generation of heat caused by irradiation of the position-detecting infrared light IR onto peripheral members of the infrared light sensor 37, it is desirable to take at least one of measures of: decreasing luminous flux width of the position-detecting infrared light IR; increasing the transverse dimension of the optical guide 37A; and increasing each infrared reflectance of the peripheral members of the infrared light sensor 37 (for example, making it higher than the infrared reflectance of a photosensitive material), so that the position-detecting infrared light IR is not applied onto other members than the optical guide 37A of the infrared light sensor 37 (and the photographic printing paper P).

As shown in FIGS. 1 through 5, a second accumulator 52 and a fourth conveying roller pair 54 are provided sequentially at the downstream side of the third conveying roller pair 50 in the direction in which the photographic printing paper P is conveyed. The second accumulator 52 has the same structure as that of the first accumulator 28 and the fourth conveying roller pair 54 has the same structure as that of the second conveying roller pair 36, and therefore, the same members will be denoted by the same reference numerals and a description thereof will be omitted.

A plurality of sensors 55 which detects the photographic printing paper P are provided along the transverse direction of the photographic printing paper P at the downstream side of the fourth conveying roller pair 54 in the direction in which the photographic printing paper P is conveyed. In the present embodiment, three sensors 55 are provided and when the photographic printing papers P are conveyed in one to three lines, these sensors 55 can detect the photographic printing papers P respectively. An inlet roller pair 56 is provided at the downstream side of the sensors 55 in the direction in which the photographic printing paper P is conveyed and is rotated due to transmission of the driving force of the motor 59. A processor section 60 (see FIG. 1) is provided at the downstream side of the inlet roller pair 56 in the direction in which the photographic printing paper P is conveyed.

As shown in FIG. 1, the processor section 60 includes a color development tank 62, a bleach-fix tank 64, and a plurality of washing tanks 66, which are arranged in that order. The color development tank 62 is filled with a color developing solution, the bleach-fix tank 64 is filled with a bleach-fix solution, and the washing tanks 66 are each filled with washing water. The photographic printing paper P conveyed into the processor section 60 is sequentially subjected to color development processing, bleach-fix processing, and washing processing in such a manner as to be sequentially immersed in processing solutions filled in the above-described processing tanks. Further, the processor section 60 also includes a plurality of replenisher tanks 68 and these replenisher tanks 68 allow supply of a development replenisher, bleach-fix replenisher, and replenishment washing water, respectively for the color development tank 62, the bleach-fix tank 64, and the washing tanks 66.

The photographic printing paper P having been subjected to washing processing is conveyed to a drying section 70 disposed above the above-described processing tanks. In the drying section 70, hot air is blown out from a chamber 72 disposed below the conveying path of the photographic printing paper P in the direction indicated by arrow U in FIG. 1 and is blown against to dry the photographic printing paper P. A plurality of roller pairs 74 are provided at the downstream side of the drying section 70 in the direction in which the photographic printing paper P is conveyed. These roller pairs 74 form a conveying path 76 of the photographic printing paper P. When the photographic printing paper P is discharged from the drying section 70 after having been subjected to the dry processing, the photographic printing paper P is nipped by these roller pairs 74 sequentially and is conveyed along the conveying path 76 to be discharged outside the printer processor 10, and is further accumulated by a sorter (not shown).

As shown in FIG. 8, the controller 20 includes CPU 20A, ROM 20B, RAM 20C, and input/output port 20D, which are connected with one another via a bus. The infrared light sensor 37 is connected to the input/output port 20D via an amplifier 78 and an analog-to-digital (A/D) converter 80. Further, connected to the input/output port 20D via an A/D converter 84 and an amplifier 82 is a temperature sensor 86. Although not illustrated, the temperature sensor 86 is provided in the vicinity of the exposure section 38 of the printer processor 10 to detect the temperature of an area near the exposure section 38.

Further, the controller 20 is connected via the input/output port 20D to an external device (not shown), for example, an image scanner. Image data which represents an image to be recorded on the photographic printing paper P is transferred from the external device to the controller 20 and print control information for specifying a print size and an aspect ratio, or a print format (bordered/no border) is inputted to the controller 20. Meanwhile, the print control information may also be inputted via input means such as a key board, which is connected to the input/output port 20D. The laser oscillator 42 is connected via a driver 88 to the input/output port 20D and the infrared lamp 43 is connected via a driver 90 to the input/output port 20D. Further, an image memory 92 having a storage capacity for storing image data of a plurality of frames is connected to the input/output port 20D.

Next, as an operation of this embodiment, an operation in which only one piece of photographic printing paper P is conveyed and an image is exposed onto the photographic printing paper P will be described with reference to a flow chart shown in FIG. 9. In step 200, the temperature of the area near the exposure section 38 is detected by taking in the data inputted from the temperature sensor 86 via the amplifier 82 and the A/D converter 84. Meanwhile, in place of the temperature of the area near the exposure section 38, the surface temperature of the photographic printing paper P may be detected.

In step 202, based on the detected temperature of the area near the exposure section 38, the temperature of the photographic printing paper P during exposure of an image in the exposure section 38 is estimated, and the intensity of the position-detecting infrared light IR is determined so that the temperature of the photographic printing paper P during exposure of an image becomes a predetermined temperature. The determined intensity is outputted to the driver 90 and an instruction for lighting the infrared lamp 43 is given to the driver 90. As a result, the driver 90 causes the infrared lamp 43 to be lighted and controls lighting of the infrared lamp 43 so that the intensity of the infrared light emitted from the infrared lamp 43 coincides with the intensity inputted from the controller 20. The above-described operation corresponds to the invention described in claims 12, 15).

In the subsequent step 204, the motor 46A is driven to rotate the polygon mirror 46 at a fixed rotating speed. As a result, the infrared light emitted from the infrared lamp 43 is deflected by the polygon mirror 46 along the main scanning direction and is made incident, as the position-detecting infrared light IR, on the infrared light sensor 37. In step 206, the delivery rollers 18, the first conveying roller pair 26, and the second conveying roller pair 36 are rotated to pull out and convey the photographic printing paper P at a fixed speed V. Further, in the subsequent step 208, counters $C_1$, $C_2$ (described later) are each set to "0".

In step 210, a signal outputted from the infrared light sensor 37 during one scanning operation of the position-detecting infrared light IR is taken in as detection data of one line through the amplifier 78 and the A/D converter 80. In the subsequent step 212, based on the detection data of one line taken in by step 210, it is determined whether the photographic printing paper P has reached a position where the infrared light sensor 37 is provided and is passing through the exposure section 38.

The detection data of one line indicates a change in the amount by which infrared light is received by the phototransistor 37B during one scanning operation of the position-detecting infrared light IR. Unless the leading end of the photographic printing paper P reaches the position where the infrared light sensor 37 is provided, the amount of the received infrared light is substantially fixed during one scanning operation of the position-detecting infrared light IR. On the other hand, when the leading end of the photographic printing paper P reaches the position where the infrared light sensor 37 is provided (as an example, see FIG. 10B, and FIGS. 10A to 10F each show the state in which the photographic printing paper P is conveyed aslant with respect to the conveying direction thereof), the position-detecting infrared light IR is shut out by the photographic printing paper P in a partial period of time during one scanning operation and the amount of the received infrared light thereby decreases (as an example, see FIG. 11A).

Accordingly, in step 212, it is determined whether the photographic printing paper P has reached the position where the infrared light sensor 37 is provided and is passing through the exposure section 38 by determining, based on the detection data of one line, whether the period of time exists in which the amount of the infrared light received by the infrared light sensor 37 decreases during one scanning operation of the position-detecting infrared light IR.

When the decision of step 212 is no, the process proceeds to step 218, in which it is determined whether the value of counter $C_1$ has become a predetermined value. Here, the predetermined value is a value which is slightly smaller than the number of scanning of the position-detecting infrared light IR conducted during the transportation of the photographic printing paper P from the position where the infrared light sensor 37 is provided to the position where an image is exposed. At this time, the value of counter $C_1$ is set to "0". For this reason, the decision of step 218 is no and thus the process proceeds to step 226. In step 226, it is determined whether the leading end of the photographic printing paper P has reached the position where an image is exposed (i.e., the position where the exposing laser beam S is irradiated). In this case, the decision of step 226 is no and thus the process returns to step 210. Accordingly, until it is determined that the photographic printing paper P has reached the position where the infrared light sensor 37 is provided, steps 210, 212, 218, and 226 are repeated.

On the other hand, when the leading end of the photographic printing paper P has reached the position where the infrared light sensor 37 is provided and the decision of step 212 is yes, the process then proceeds to step 214, in which the value of counter $C_1$ is incremented by one. The operation of step 214 is effected repeatedly while the photographic printing paper P is passing through the position where the infrared light sensor 37 is provided, and therefore, the value of counter $C_1$ corresponds to the number of times of scanning of the position-detecting infrared light IR across the photographic printing paper P, namely, a code which identifies each of scanning operations.

In the subsequent step 216, the time $\Delta T$ from the beginning of one scanning operation of the position-detecting infrared light IR to the time at which the photographic printing paper P starts shut-out of the position-detecting infrared light IR (i.e., the time at which the amount of the infrared light received by the infrared light sensor 37 decreases) is calculated (see FIG. 11A) and the calculated result is stored in RAM 20C in such a manner as to correspond to the value of counter $C_1$. The scanning speed "s" of the position-detecting infrared light IR is fixed, and therefore, the time $\Delta T$ corresponds to an end of a portion on the photographic printing paper P in which the position-detecting infrared light IR is shut out (which the portion will be hereinafter referred to simply as "shading portion"). More specifically, the time $\Delta T$ corresponds, as shown in FIG. 10B, to a distance "x" from the position where scanning of the position-detecting infrared light IR starts (i.e., reference position) to the end of the photographic printing paper P ($x = s \times \Delta T$). The above-described operation corresponds to the invention described in claim 10.

The above steps 214, 216 are repeated while the photographic printing paper P is passing through the position where the infrared light sensor 37 is provided. So long as an inclination $\theta$ of the photographic printing paper P is 0, the time $\Delta T$ and distance x are each constantly set fixedly. However, when the inclination $\theta$ of the photographic printing paper P is set such that $\theta \neq 0$, the distance x (and the time $\Delta T$) changes momentarily as shown in FIGS. 10B through 10F.

Meanwhile, when the decision of step 212 is yes for the first time, the following operation is effected in parallel with the operations of the above steps 214 and 216. Namely, the third conveying roller pair 50 and the fourth conveying roller pair 54 are rotated, the guide member 32A of the first accumulator 28 is brought into a vertical state (indicated by the two-dot chain line in FIG. 5), and further, the delivery rollers 18 and the first conveying roller pair 26 are rotated at the speed higher than that of the second conveying roller pair 36. As a result, the photographic printing paper P is pulled out from the magazine 14 at a high speed and a loop of the photographic printing paper P is formed between the first conveying roller pair 26 and the second conveying roller pair 36.

When the photographic printing paper P is pulled out by a predetermined length corresponding to the size of an image to be exposed, pull-out of the photographic printing paper P is temporarily stopped and a rear end of the photographic printing paper P is cut off by the cutter 22. Until a rear end of the photographic printing paper P passes through the first conveying roller pair 26, the photographic printing paper P is further conveyed. As a result, the leading end of the photographic printing paper P is nipped by the second conveying roller pair 36 so that the photographic printing paper P is brought into a state of hanging down from the second conveying roller pair 36. Synchronized with the rotation of the second conveying roller pair 36, the photographic printing paper P is conveyed sequentially into the exposure section 38 at a fixed speed V.

On the other hand, when the operation of step 216 is completed, the process proceeds to step 218. The decision of step 218 is no until the value of counter $C_1$ reaches the predetermined value, and therefore, steps 210 through 218, and 226 are repeated until the value of the counter $C_1$ reaches the predetermined value.

When the value of counter $C_1$ has reached the predetermined value, the decision of step 218 is yes and the process proceeds to step 220. In step 220, the distance $\Delta x$ between the position of an end of the shading portion on the photographic printing paper P when the leading end of the photographic printing paper P has reached the position where the infrared light sensor 37 is provided and the position of an end of a current shading portion on the photographic printing paper P is calculated.

Specifically, based on the latest detection data of one line taken in by the operation of step 210, the time $t_s$ from the beginning of one scanning operation of the position-detecting infrared light IR to the beginning of shading of the position-detecting infrared light IR by the photographic printing paper P and the time $t_e$ from the beginning of one scanning operation of the position-detecting infrared light IR to the completion of shading are calculated (see FIG. 11A). Subsequently, the time period $\Delta T$ obtained by the first scanning operation ($C_1$) of the position-detecting infrared light IR, (which time $\Delta T$ corresponding to the position of the end of the shading portion of the photographic printing paper P when the leading end of the photographic printing paper P has reached the position where the infrared light sensor 37 is provided), is taken in, the differences in time between the taken-in time $\Delta T$ and each of the shading start time $t_s$ and the shading finish time $t_e$ ($\Delta T - t_e$, $\Delta T - t_s$) are calculated, and one of the differences in time ($\Delta T - t_e$, $\Delta T - t_s$), of which absolute value is larger than the other, is selected. Therefore, a value obtained by multiplying the selected difference in time ($\Delta T - t_e$ or $\Delta T - t_s$) by the scanning speed "s" of the position-detecting infrared light IR is set as the distance $\Delta x$ (as an example, see FIG. 11B).

In step 222, based on the distance $\Delta x$, the conveying speed V of the photographic printing paper P, and the elapsed time $\Delta t$ after the leading end of the photographic printing paper P has reached the position where the infrared light sensor 37 is provided (provided that $\Delta t$=the number of scan $C_1 \times$ scan cycle T), the inclination $\theta$ of the photographic printing paper P with respect to the transverse direction of the conveying path of the photographic printing paper P (i.e., the scan direction of the exposing laser beam S) is calculated in accordance with the following expression (1).

$$\theta = \tan^{-1} \frac{V \times \Delta t}{\Delta x} \quad (1)$$

Meanwhile, in the present embodiment, when the photographic printing paper P is inclined in a clockwise direction in the case of $\theta=0$, the sign of inclination $\theta$ is positive. Further, when the photographic printing paper P is inclined in a counterclockwise direction, the sign of inclination $\theta$ is negative. For example, in the example shown in FIG. 10B, the photographic printing paper P is inclined in the counterclockwise direction and the sign of $\Delta x$ is negative, i.e., (($\Delta T - t_e) \times s$). Accordingly, the sign of inclination $\theta$ also becomes negative.

Further, when the inclination of the photographic printing paper P is large (for example, when the absolute value of inclination $\theta$ is greater than or equal to the predetermined value), or when the photographic printing paper P is moved far apart from a predetermined position (for example, when the value of distance x deviates from a predetermined range), it is determined that an abnormal state has occurred and the subsequent operation may be stopped by giving warning.

In step 224, in accordance with the calculated inclination $\theta$ of the photographic printing paper P and a specified print format (bordered/no border), an area in which image data is to be read (image-data reading area) is set within an area for storing image data transferred from an exterior in the image memory 92.

Figure 12A:
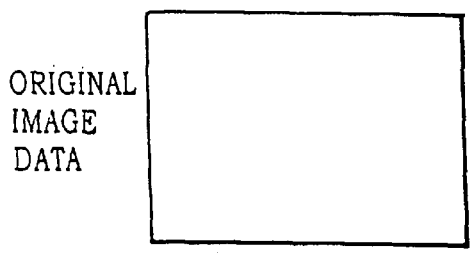
FIGS. 12A through 12E are each an imaginary diagram.

The image data is the data in which an image is divided into a large number of pixels in matrix manner and the gradation of each pixel (in the case of color image data, the gradation of each color component (for example, each of the colors of R, G, and B) of each pixel) is represented in quantized manner. Usually, an image is recorded in such a manner that image data are read out for each of the data of the pixels in a fixed order (for example, in raster order). For this reason, even in the present embodiment, the image data transferred from an external equipment (see FIG. 12A) are stored in the image memory 92 for each of the data of color components of R, G, and B so that the data of each pixel are arranged along the direction in which the image data is read out from the image memory 92. Meanwhile, in FIG. 12B, an area on the image memory 92 in which image data is stored is conceptually shown as an external frame.

Figure 12B:
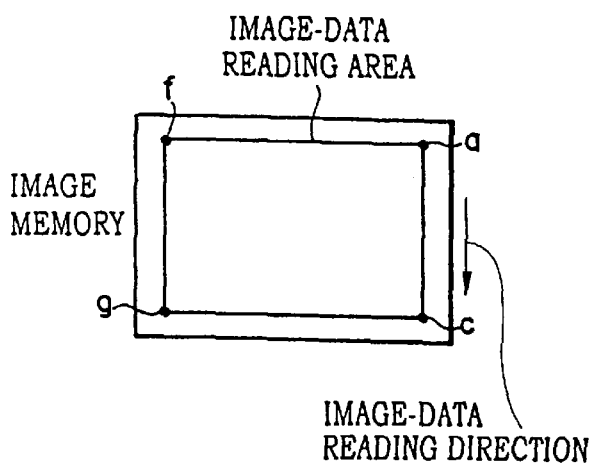
Figure 12D:
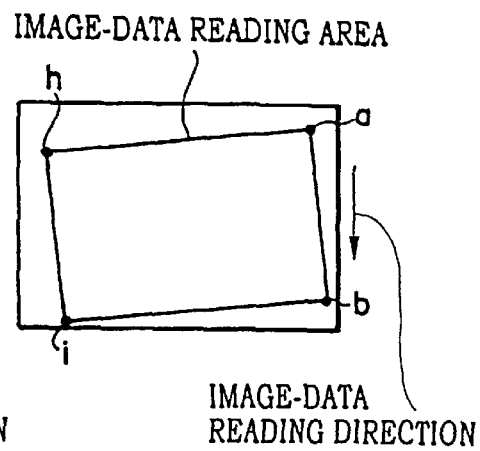
Figure 12C:
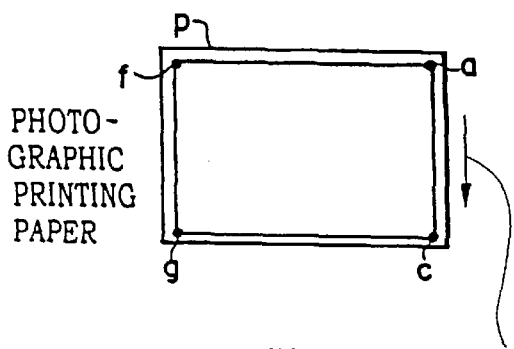

Here, when the inclination $\theta$ of the photographic printing paper P is 0 as shown in FIG. 12C, four sides of the photographic printing paper P are parallel or perpendicular to the image recording direction (i.e., the scan direction of the exposing laser beam S), and therefore, the data of each pixel may be read and recorded in a fixed order in the same way as in a conventional method. For this reason, as conceptually shown in FIG. 12B, an image data reading area (a, c, f, g) which is formed from the sides which are parallel or perpendicular to the image data reading direction is set for the image-data storage area on the image memory 92.

Meanwhile, FIGS. 12A through 12E each show the case in which the "bordered" is specified as the print format. The image recording area on the photographic printing paper P in the case of the "bordered" is smaller than that in the case of the "no border". For this reason, in FIG. 12B, the size of the image-data reading area is made slightly smaller than that of the "no border" (by an area of white border). Further, in place of making the size of the image reading area smaller as described above, the image may be recorded in such a manner that the size of the image-data to be recorded is reduced by the area of white border during image recording processing.

Figure 12E:
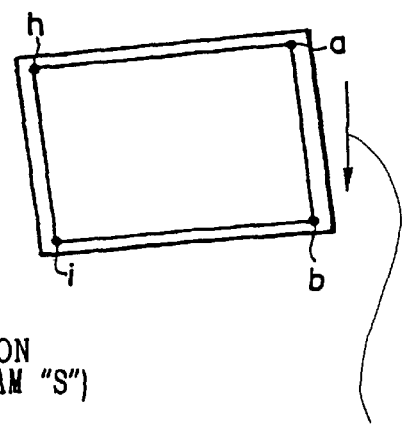

On the other hand, when the inclination $\theta$ of the photographic printing paper P is not 0 as shown in FIG. 12E, assuming that the image-data reading area is set as shown in FIG. 12B and data is read out from the image-data reading area in a fixed reading direction, the image recording area is inclined by an inclination $\theta$ with respect to the side of the photographic printing paper P. For this reason, as conceptually shown in FIG. 12D as an example, after setting of the image-data reading area (a, c, f, g), the orientation of the image-data reading area (a, c, f, g) is inclined by an inclination $\theta$ with respect to the image-data reading direction (when the sign of the inclination $\theta$ is positive, the direction of inclination is a clockwise direction, and when the sign of the inclination $\theta$ is negative, the direction of inclination is a counterclockwise direction). In FIG. 12D, the image-data reading area (a, c, f, g) is inclined by being rotated around the point "a", and as a result, a new image-data reading area (a, b, h, i) is set.

Figure 13C:
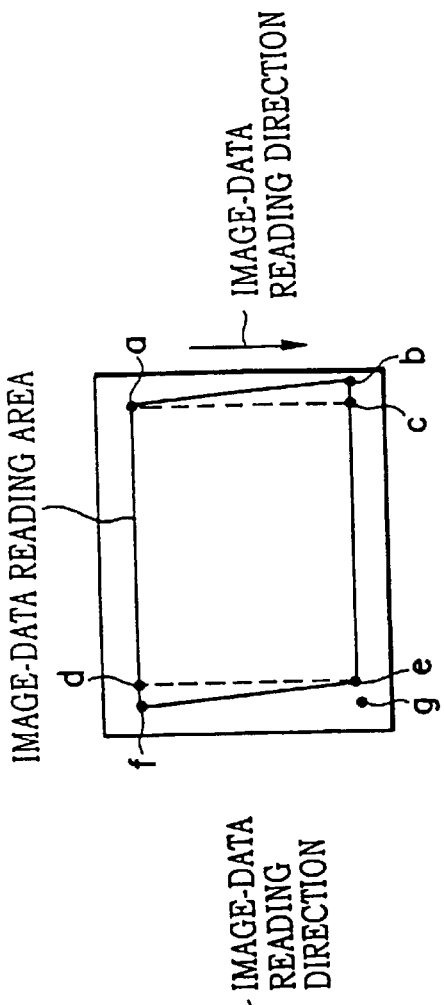
FIGS. 13A through 13D are each an imaginary diagram.

Meanwhile, although FIG. 12D shows that the image-data reading area (a, c, f, g) is inclined by being rotated around the point "a", the present invention is not limited to the same. For example, as shown in FIG. 13A, a new image-data reading area (j, k, m, n) may be set in such a manner that the image-data reading area (a, c, f, g) is inclined by being rotated around the center of the image-data reading area. Further, as shown in FIG. 13C, a new image-data reading area (a, b, f, e) may be set in such a manner that each position of two corners (in FIG. 13C, point "c" and point "g") among four corners of the image-data reading area is moved so that two of four sides of the image-data reading area are each inclined by an inclination θ with respect to the image data reading direction.

In FIGS. 12A to 12E and FIGS. 13A to 13D, in order to facilitate understanding of this embodiment, the inclination of the photographic printing paper P is shown exaggeratingly and the image-data reading area is made smaller than the image-data storage area in accordance with the exaggerated inclination. However, there is no possibility that, in an actual device, the photographic printing paper P is inclined largely as illustrated in these drawings, and conveying accuracy of the photographic printing paper P is considerably high. The present embodiment is constructed such that an image represented by image data stored in the image reading area is recorded in accordance with the position of the photographic printing paper P represented by the time ΔT or the distance x. For this reason, it is not necessary to take account of variation of the position of the photographic printing paper P during setting of the image-data reading area, and the size of the image-data reading area is allowed to approach to that of the image-data storage area. Accordingly, omission of an image when an image is recorded on the photographic printing paper P can be restrained to the minimum.

After setting of the image-data reading area as described above, the process proceeds to step 226. Meanwhile, the above steps 220 through 224 are executed only when the value of counter $C_1$ coincides with a predetermined value. Only steps 210 through 218, and 226 are repeated until each operation of steps 220 through 224 is effected once and the decision of step 226 becomes affirmative (i.e., until the leading end of the photographic printing paper P reaches the exposure position).

When the decision of step 226 is yes, the process proceeds to step 228, in which the value of counter $C_2$ is incremented by one. In step 230, image data of R, G, and B of only one line (i.e., data of pixels stored in a portion located on one line parallel to the reading direction among the image data stored in the image-data reading area) is read, as the data to be stored (hereinafter it may be referred to just as "recording data"), from the image-data reading area in the image memory 92 set in the above step 224 along the image-data reading direction.

In step 232, the time ΔT which is obtained by the $C_2$-th (first, $C_2$=1) scanning operation of the position-detecting infrared light IR after the leading end of the photographic printing paper P has reached the position where the infrared light sensor 37 is provided is read out from RAM 20C and is outputted to the driver 88 together with the recording data of one line read in step 230, and further, an instruction for recording of image of one line is given. As a result, when the "no border" is set as the print format, the driver 88 starts driving the laser oscillator 42 when the time ΔT has elapsed after an irradiation position of the exposing laser beam S is set at the scan start position (reference position) and laser beams modulated in accordance with the gradation value of each of pixels represented by the above inputted recording data are emitted sequentially from the laser oscillator 42.

The time ΔT is the period from the beginning of one scanning operation of the position-detecting infrared light IR to the beginning of shading of the position-detecting infrared light IR by the photographic printing paper P, and it corresponds to the distance x between the scan start position of the position-detecting infrared light IR to the end portion of the photographic printing paper P. For this reason, when the irradiation position of the exposing laser beam S moved (scanned) with the rotation of the polygon mirror 46 reaches the end portion of the photographic printing paper P, the laser beam is emitted from the laser oscillator 42. Further, when emission of the laser beams modulated in accordance with the inputted recording data is completed, emission of the laser beams from the laser oscillator 42 is stopped.

The direction in which dots recorded by the exposing laser beam S are arranged (i.e., recording direction) coincides with the main scanning direction. However, as described above, the exposing laser beam S is emitted from the scan/exposure device 40 regardless of the position or inclination of the photographic printing paper P only when the irradiation position of the exposing laser beam S is situated on the photographic printing paper P, and therefore, by repeating the above-described operation, the exposing laser beam S is irradiated only on the photographic printing paper P and an image is recorded on the whole surface of the photographic printing paper P.

Further, in a case in which the "bordered" is set as the print format, the driver 88 starts driving the laser oscillator 42 on the basis of the previously known width of a white border on the photographic printing paper P and inclination θ of the photographic printing paper P, when the time required for the irradiation position of the exposing laser beam S to reach the image recording area on the photographic printing paper P (i.e., an area inside of the white border) has elapsed after the lapse of the time ΔT, and the laser beams modulated in accordance with the gradation value of each of the pixels represented by the above input recording data are sequentially emitted from the laser oscillator 42.

Figure 13D:
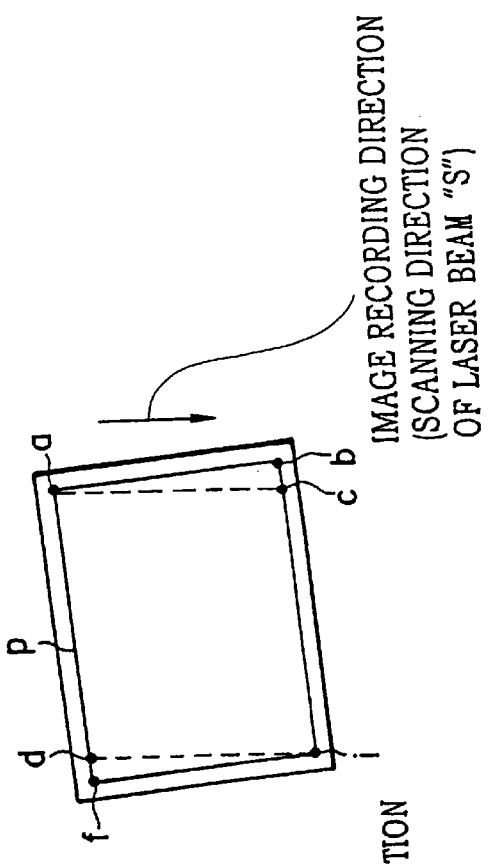
Figure 13A:
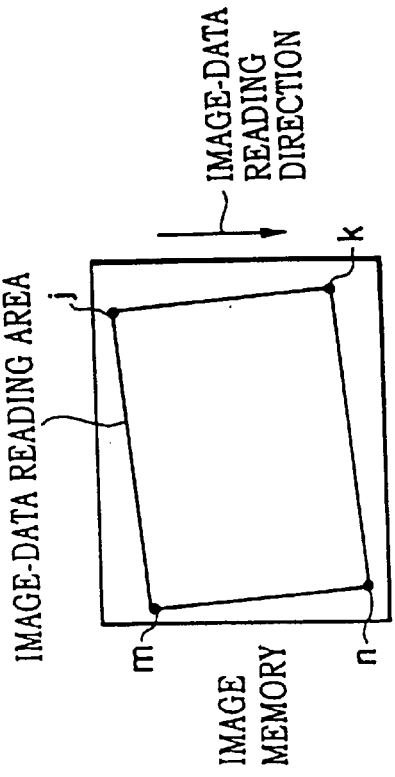
Figure 13B:
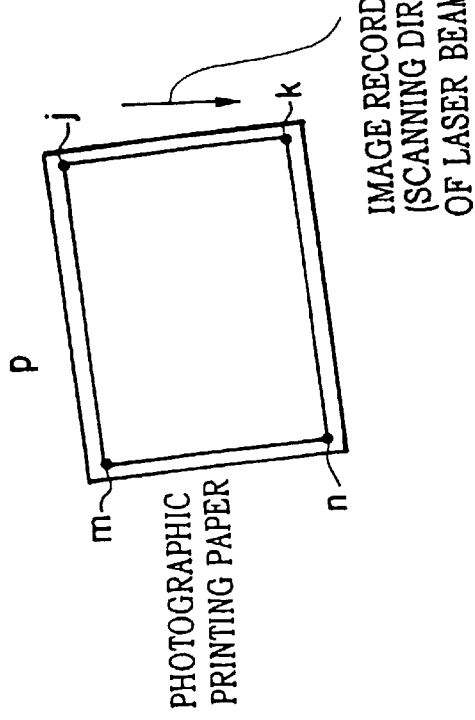

As a result, the exposing laser beam S is emitted from the scan/exposure device 40 regardless of the position or inclination of the photographic printing paper P only when the irradiation position of the exposing laser beam S is located within the image recording area on the photographic printing paper P (for example, the area (a, c, f, g) shown in FIG. 12C, the area (a, b, h, i) shown in FIG. 12E, the area (j, k, m, n) shown in FIG. 13B, the area (a, b, f, i) shown in FIG. 13D, and the like), and by repeating the above-described operation, the exposing laser beam S is irradiated only on an inside are of the white border on the photographic printing paper P and an image is recorded on the whole surface inside the white border on the photographic printing paper P, and further, the width of the white border becomes substantially fixed.

Further, when the above-described image exposure processing is effected, the position-detecting infrared light IR whose intensity is varied in accordance with the temperature of the area near the exposure section 38 is previously irradiated on the whole surface of the photographic printing paper P. For this reason, the temperature of the photographic printing paper P during the image exposure processing becomes substantially fixed and the finished state of an image exposed and recorded on the photographic printing paper P also becomes substantially fixed.

After the operation of step 232, it is determined in step 234 whether image recording processing has been completed. Until the decision of step 234 becomes affirmative, the above operation is repeated. When the image recording processing has been completed, in step 236, the infrared lamp 43 is turned off to stop rotation of the polygon mirror 46 and the process ends.

Meanwhile, when images are continuously exposed onto a plurality of photographic printing papers P, steps 208 through 234 are repeated (steps 200 and 202 may also be repeated). The photographic printing paper P onto which an image is exposed in the exposure section 38 is conveyed into the processor section 60 via the third conveying roller pair 50, the second accumulator 52, and the fourth conveying roller pair 54 and is subjected to color development processing, bleach-fix processing, washing processing, and dry processing so that an image is brought into a visible state, and finally, the processed photographic printing paper P is discharged, as a photographic print, out from the printer processor 10.

Meanwhile, in the foregoing, the orientation of the image-data reading area is varied and set in accordance with the inclination θ of the photographic printing paper P, but the present invention is not limited to the same. In other words, among the image-data storage area, the area not including the image-data reading area described above (for example, the area not including the area (a, c, f, g) shown in FIG. 12C, the area not including the area (a, b, h, i) shown in FIG. 12E, the area not including the area (j, k, m, n) shown in FIG. 13B, the area not including the area (a, b, f, i) shown in FIG. 13D, and the like) may be filled with white border data for recording the white border (for example, data which indicates that density of each of the colors of R, G, and B equals zero), which shows the image data processing described in claim 8, and data stored in the whole area of the image-data storage area may be read as the recording data.

In this case, even when the photographic printing paper P is inclined, it is not necessary for the driver 88 to vary, for each different line, the period of time between the moment when the irradiation position of the exposing laser beam S is located at the scan start position and that when the driver 88 starts driving the laser oscillator 42. Instead, the driver 88 can start driving the laser oscillator 42 after a predetermined time, corresponding to the position of the photographic printing paper P has lapsed, from the moment when the irradiation position of the exposing laser beam S was located at the scan start position.

Further, the image data processing operation is not limited to the above-described operation in which the area outside the image-data reading area is filled with the white edge data. For example, data may be re-stored after transforming the coordinates of each of pixels of the image data in accordance with the inclination θ of the photographic printing paper P in such a manner that the direction in which the pixels represented by the image data are arranged is inclined to the image-data reading direction. As previously described, the image data transferred from an external device (see FIG. 14A) are stored in the image memory 92 for each of the color components of R, G, and B such that the data of the pixels are arranged along the direction in which the image data are read from the image memory 92 (see FIG. 14B).

Here, as an example, when the photographic printing paper P shown in FIG. 14D is set such that θ≠0, transformation of coordinates is effected for each of the pixels of the image data so that the direction in which the pixels represented by the image data stored in the image memory 92 are arranged is inclined to the image-data reading direction by an inclination θ. However, when transformation of coordinates is effected for the image data as described above, for example, as shown in FIG. 15, in most cases, the position of each of the pixels represented by the image data after transformation of coordinates does not geometrically coincide with the position (i.e., lattice point) of each of the pixels of the image recorded by the exposing laser beam S.

For this reason, new image data, pixels of which are positioned on lattice points of a recorded image (recording image data), is obtained from the image data which has been subjected to transformation of coordinates. Specifically, density d (x, y) of each of the pixels of the image data to be recorded (or the recording image data) is calculated, by interpolation, for each of the color components based on densities d(m, n), d(m+1, n), d(m, n+1), and d(m+1, n+1) and in accordance with the following expression (2):

$$d(x, y) = d(m, n)(1-\alpha)(1-\beta) + d(m+1, n)\alpha(1-\beta) + \\ d(m, n+1)(1-\alpha)\beta + d(m+1, n+1)\alpha\beta \qquad (2)$$

Meanwhile, α and β each represent a deviation between the position of a lattice point represented by the recording image data and the position of a lattice point represented by the image data after transformation of coordinates. The recording image data thus obtained is re-stored in the image memory 92 (see FIG. 14C). When an image is recorded, data stored in the whole area of the recording-image-data storage area (i.e., the area (o, p, q, r)) is read as the recording data (see FIG. 14D). In this case, although the operation becomes slightly complicated, an image represented by the image data transferred from an external device can be recorded on the photographic printing paper P without causing omission of the image and regardless of variations of the position and orientation of the photographic printing paper P.

Further, in the foregoing, the operation in which only one photographic printing paper P is conveyed and an image is exposed onto the photographic printing paper P was described for simplification of an explanation. However, even when a plurality of photographic printing papers P (which may have different sizes) are conveyed in parallel, an image can be exposed onto each of the photographic printing papers P in the same way as the aforementioned.

When the plurality of photographic printing papers P are conveyed, as shown in, for example, FIGS. 16A to 16C, and FIG. 17 (each showing the case in which the photographic printing paper P1 and the photographic printing paper P2 are conveyed in parallel), the position of each of the photographic printing papers P (time ΔT or distance x) and the inclination thereof are not fixed. For this reason, the positions of the photographic printing papers P are obtained for each of the photographic printing papers P with the scan start position being set as the reference (see distances $x_1$, $x_2$ shown in FIGS. 16A to 16C). Further, in order to detect the inclination θ of the photographic printing paper P, elapsed times $\Delta t_1$, $\Delta t_2$ (see FIG. 17) after the leading ends of the photographic printing papers P1, P2 have reached the position where the infrared light sensor 37 is provided are each counted, distances $\Delta x_1$, $\Delta x_2$ (see FIG. 17) are each obtained at a predetermined timing, and the obtained values are substituted into the expression (1). Thus, the inclinations θ1, θ2 shown in FIGS. 16A to 16C, and FIG. 17 are calculated. As previously described, in accordance with the inclination θ of each of the photographic printing papers P, the image-data reading area may be settled or the image data may be processed to allow recording of an image on each of the photographic printing papers P.

In the above-described embodiment, the position and orientation of the photographic printing paper P are recognized by detecting the position of an end of the photographic printing paper P by the infrared light sensor 37. However, the transverse and longitudinal dimensions of the photographic printing paper P can also be detected from the position of the end of the photographic printing paper P. Accordingly, the following methods may be used: the length of a processed photographic printing paper P is accumulated based on the transverse and longitudinal dimensions of the photographic printing paper P for each of the photographic printing papers P having different transverse dimensions (sizes) so that the proper time at which the photographic printing paper P should be supplied is estimated and reported for each size of the photographic printing paper P; and when the remaining amount of the photographic printing paper P becomes a predetermined value or less prior to the entire photographic printing paper P within the magazine 14 being completely processed, warning is given for each size of the photographic printing paper P.

Further, in the foregoing, the example was described in which an image is recorded, in such a manner that the main scan processing of the exposing laser beam S is effected while the sub-scan processing is effected by conveying the photographic printing paper P, but the present invention is not limited to the same. The present invention can also be applied to the case in which, with a recording material such as the photographic printing paper P being set in a stationary state, an image is recorded thereon in such a manner that slit exposure light is irradiated and the position where the light is irradiated is moved (sub-scanned).

As an example, in an image recording apparatus 100 shown in FIG. 18, the photographic printing paper P is conveyed by a conveying device (not shown) and is positioned at a location shown in FIG. 18. An exposure device 102 is formed to include a line-type liquid crystal panel or a line-type digital micro-mirror device (DMD) and recording slit light (the longitudinal direction of which coincides with the direction perpendicular to the plane of the paper of FIG. 18) modulated by the line-type device in accordance with an image to be recorded is emitted from the exposure device 102. The recording slit light is reflected by a reflecting mirror 104 and is irradiated onto the photographic printing paper P, and an image of one line is exposed simultaneously. Movement (sub-scan) of the irradiation position of the recording slit light is achieved by a movement of the reflecting mirror 104 along the direction indicated by arrow A in FIG. 18. As a result, an image is exposed onto the photographic printing paper P.

When the present invention is applied to the image recording apparatus 100 having the above-described structure, for example, the exposure device 102 is provided with a light source which emits position-detecting light such as infrared light and the direction in which the position-detecting light is emitted from the light source is adjusted so that the position-detecting light is irradiated on one end portion of the photographic printing paper P along the direction perpendicular to the sub-scan direction and the irradiation position of the position-detecting light is located at the downstream side, in the sub-scan direction, of the position where the recording slit light is irradiated on the photographic printing paper P. Further, when an optical sensor is provided to correspond to the position-detecting light and the reflecting mirror 104 moves so as to move the irradiation position of the position-detecting light, the optical sensor 106 is adapted to move along the direction indicated by arrow B in FIG. 18 synchronously therewith.

According to the above-described structure, the amount of the position-detecting light incident on the optical sensor 106 varies in accordance with the position of the end portion of the photographic printing paper P. For this reason, the position of the end portion of the photographic printing paper P can be sequentially detected along the sub-scan direction based on the amount of the received position-detecting light. So long as the image recording position of the recording slit light is varied in accordance with the detected position of the end portion, an image can be recorded at a fixed position on the photographic printing paper P regardless of the position of the photographic printing paper P. Further, so long as the optical sensor 106 is formed by an optical sensor such as CCD having a large number of light-receiving cells, the position of the end portion of the photographic printing paper P can be detected at high accuracy based on the amount of light received by each of the light-receiving cells. Accordingly, based on the variation of the position of the end portion of the photographic printing paper P along the sub-scan direction, the inclination θ of the photographic printing paper P can also be detected.

Then, so long as an image is recorded by effecting at least one of operations of varying the image-data reading area and of processing the image data based on the detected position and inclination θ of the end portion of the photographic printing paper P, an image is recorded at a fixed position on the photographic printing paper P and at a fixed orientation.

Further, in the foregoing, the sensor for detecting the position (and orientation) of the recording material (in the present embodiment, the infrared light sensor 37) is provided in the vicinity of the image recording position (in the present embodiment, the exposure section 38), but the present invention is not limited to the same. For example, a sensor provided at any position on the conveying path of the recording material leading to the image recording position may be used to estimate the position (and orientation) of the recording material at the image recording position based on the detection results obtained by the sensor. The step for detecting the position (and orientation) of the recording material in the recording section, described in the present invention, also includes the above-described detection.

Moreover, in the foregoing, the reading area of the image data from the image memory 92 is varied or the image data is processed in accordance with the orientation (inclination θ) of the photographic printing paper P. However, the present invention is not limited to the same. For example, a mechanism which allows the direction in which the recording laser beam scans to be arbitrarily varied may be provided to vary the scanning direction of the exposing laser beam S in accordance with the orientation of the photographic printing paper P. Alternatively, so long as the structure may be provided in which an image is recorded in such a manner that exposing light is irradiated on the stationary photographic printing paper P positioned on a stage, a mechanism which can arbitrarily vary the orientation of the stage may be provided to vary the orientation of the stage in accordance with the orientation of the photographic printing paper P.

In addition, the case was described in which an image is recorded due to the exposing laser beam S being irradiated on the photographic printing paper P, but photosensitive materials other than the photographic printing paper may be used as the recording material, and a heat sensitive paper, a plain paper, an OHP sheet, and the like can also be applied. Further, as the image recording system for the recording material, the present invention may also be applied to the case in which an image is recorded on a recording material by an electrophotographic system, the case in which an image is recorded on a recording material by an ink-jet system, the case in which an image is recorded on a heat-sensitive paper by a heat-sensitive recording system, and the like.

For example, in the case of image recording processing using an electrophotographic system, an image is recorded on the recording material in such a manner that an electrostatic latent image is formed on an image carrying member, the electrostatic latent image is developed to form a toner image, and the toner image is transferred to the recording material. Application of the present invention to the above-described recording system can be realized by, for example, detecting the position and orientation of the recording material in a copying section (i.e., the recording section of the present invention) and by varying the position and orientation of the electrostatic latent image to be formed on the image carrying member in accordance with the detected position and orientation of the recording material.

As described above according to one aspect of the invention is an image is recorded on a recording material in such a manner that the position of the recording material in the recording section is detected and the position of the range of the image to be recorded is varied to coincide with the detected position of the recording material. For this reason, an excellent effect can be achieved in that an unnecessary unrecorded portion is not formed on the recording material and an image can be recorded in such a manner that omission of the image is restrained to the minimum.

The invention according to another aspect of the invention each position of a plurality of recording materials in the recording section is detected and the position of the range of an image to be recorded for each of the plurality of recording materials is varied to coincide with the detected position of each of the plurality of recording materials. Accordingly, an excellent effect can be achieved in that an unnecessary unrecorded portion is not formed on each of the recording materials conveyed in parallel and images can be recorded in such a manner that omission of an image on each of the recording materials is restrained to the minimum.

According to another aspect of the invention, the inclination of the recording material in the recording section is detected and the inclination of the range of an image to be received is also varied to coincide with the detected inclination of the recording material. Accordingly, in addition to the above-described effects, a further effect can be achieved in that even when the orientation of the recording material during image recording processing varies widely, an unnecessary unrecorded portion is not formed on the recording material and omission of an image on the recording material can be restrained to the minimum.

According to another aspect of the invention the inclination of the recording material in the recording section is detected, and based on the detected inclination of the recording material, an image-data reading direction and a recording direction at the time of image recording processing, either an image-data reading area is varied to coincide with the detected inclination of the recording material, or the image data stored in storage means is processed to correspond to the detected inclination of the recording material. Accordingly, an excellent effect can be achieved in that when an image is recorded based on image data, an unnecessary unrecorded portion is not formed on the recording material and omission of an image on the recording material can be restrained to the minimum without image processing and device structure being made extremely complex.

According to another aspect of the invention coordinates of each of pixels of image data is transformed so that the direction in which pixels represented by the image data in the storage means are arranged is inclined with respect to the image data reading direction by an amount of inclination of the recording material with respect to the recording direction at the time of image recording processing and the image data thus obtained are re-stored in the storage means. Accordingly, in addition to the above-described effects, even when the orientation of the recording material varies greatly, an image of high quality with the longitudinal direction of the image coinciding with that of the recording material can be obtained.

According to another aspect of the invention the embodiments are each constructed in that the position where the detecting light is irradiated on the recording material is moved. Accordingly, in addition to the above-described effects, the irradiation position of the detecting light can be moved without the device structure being made complex.

According to another aspect of the invention, the embodiments are each constructed in that at least one of the temperature of a photosensitive material as the recording material and the temperature of the recording section is detected, and based on the detected temperature, the intensity of the detecting infrared light is varied, and further, the detecting infrared light is irradiated on the whole surface of the recording material. Accordingly, in addition to the above-described effects, an excellent effect can be achieved in that when the photosensitive material is used as the recording material, a recorded image in a substantially fixed finished state can be obtained regardless of variation of the ambient temperature, and the like.

What is claimed is:

1. An image recording method in which an image is recorded on a recording material conveyed to a recording section, comprising the steps of:

detecting a position of the recording material in the recording section;

determining an inclination of the recording material in the recording section based on the detected position;

adjusting an inclination of a range of image data to be recorded based on the determined inclination of the recording material; and recording an image on the recording material based on the adjusted range of image data.

2. An image recording method in which an image is recorded on each of a plurality of recording materials conveyed in parallel to a recording section, comprising the steps of:

detecting a position of each of the plurality of recording materials in the recording section;

determining an inclination of each of the plurality of recording materials in the recording section;

adjusting an inclination of a range of image data to be recorded on each of the plurality of recording materials based on the determined inclination of each of the plurality of recording materials; and recording an image on each of the plurality of recording materials based on the adjusted inclination of the range of image data to be recorded on each of the plurality of recording materials.

3. An image recording method in which stored image data is read in a fixed reading direction, and an image is recorded in a recording range in a fixed recording direction based on the read image data and is recorded on a recording material conveyed to a recording section, said method comprising the steps of:

determining an inclination of the recording material in the recording section;

reading image data, including adjusting an area in which the stored image data is read to coincide with the determined inclination of the recording material based on the determined inclination of the recording material and the reading and recording directions; and recording an image on the recording material based on the read image data.

4. An image recording method according to claim 3, wherein the adjust of the area in which the stored image data is read is set such that the image data reading area is inclined with respect to the image data reading direction by an amount of inclination of the recording material with respect to the recording direction at a time of image recording processing.

5. An image recording method according to claim 3, wherein the the reading of the stored image data includes an operation in which data which corresponds to an area outside the inclined image data reading area is eliminated.

6. An image recording method according to claim 5, wherein the operation for eliminating the data which corresponds to other area than the inclined image data reading area is effected in such a manner that the other area than the image data reading area is filled with data which indicates that each density of colors of R, B, and G equals zero.

7. An image recording method according to claim 3, further comprising the steps of:

applying detecting light onto the recording material and moving a position where the detecting light is irradiated; and detecting at least one of the position and inclination of the recording material by detecting one of reflection timing and shading timing of the detecting light.

8. An image recording method according to claim 7, wherein an image is recorded on the recording material in such a manner that recording light modulated in accordance with an image to be recorded is irradiated on the recording material and a position where the recording light is irradiated on the recording material is moved in compliance with the movement of said position where the detecting light is irradiated on the recording material is moved.

9. An image recording method according to claim 7, wherein the recording material is a photosensitive material and the detecting light is infrared light, said method comprising the further steps of:

detecting at least one of a temperature of the recording material and a temperature of the recording section; and varying an intensity of the infrared light based on the detected temperature and applying the infrared light onto the whole surface of the recording material.

10. An image recording method according to claim 3, further comprising the steps of:

applying detecting light onto the recording material; and detecting a position of the recording material by detecting an amount of light which is not reflected or shut out by the recording material or light which is reflected or shut out by the recording material.

11. An image recording method according to claim 10, wherein an image is recorded on the recording material in such a manner that recording light modulated in accordance with an image to be recorded is irradiated on the recording material and a position where the recording light is irradiated on the recording material is moved in compliance with a movement of said position where the detecting light is irradiated on the recording material is moved.

12. An image recording method according to claim 10, wherein the recording material is a photosensitive material and the detecting light is infrared light, said method comprising the steps of:

detecting at least one of the temperature of the recording material and the temperature of the recording section; and varying an intensity of the infrared light based on the detected temperature and applying the infrared light onto the whole surface of the recording material.

13. An image recording method according to any one of claims 1, 3, or 7, wherein the inclination ($\theta$) of the recording material is obtained by using the steps of:

applying infrared light onto the recording material conveyed to the recording section and calculating time from the beginning of scan of one line to the beginning of shading by the recording material;

storing the calculated time;

effecting steps of applying infrared light and calculating time and storing the calculated time repeatedly until the number of times of scan of the infrared light across the recording material becomes a predetermined value;

calculating a distance ($\nabla x$) obtained by the calculation, a conveying speed (v) of the recording material, and an elapsed time ($\nabla t$) after the leading end of the recording material has reached the position of the optical sensor and in accordance with the following expression:

$$\theta = \tan^{-1}\frac{v_x \nabla t}{\nabla x}.$$

14. An image recording method in which stored image data is read in a fixed reading direction, and an image is recorded in a recording range in a fixed recording direction based on the read image data and is recorded on a recording material conveyed to a recording section, said method comprising the steps of:

determining an inclination of the recording material in the recording section;

reading the stored image data and processing the read image data based on the determined inclination of the recording material to correspond to the determined inclination of the recording material; and recording an image on the recording material based on the read image data.

15. An image recording method according to claim 14, wherein the processing of the read image data includes an operation in which coordinates of each of pixels of image data is transformed so that the direction in which pixels represented by the stored image data are arranged is inclined with respect to the reading direction by an amount of inclination of the recording material with respect to the recording direction at the time of image recording processing and the obtained image data is re-stored.

* * * * *